United States Patent
Okumura et al.

(10) Patent No.: US 7,643,845 B2
(45) Date of Patent: *Jan. 5, 2010

(54) TRANSMISSION POWER CONTROL DEVICE AND METHOD, MOBILE STATION, AND COMMUNICATION DEVICE IN MOBILE COMMUNICATION SYSTEM

(75) Inventors: Yukihiko Okumura, Yokohama (JP); Shinsuke Ogawa, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/674,276

(22) Filed: Feb. 13, 2007

(65) Prior Publication Data

US 2007/0129096 A1 Jun. 7, 2007

Related U.S. Application Data

(63) Continuation of application No. 10/380,768, filed as application No. PCT/JP02/07453 on Jul. 23, 2002, now Pat. No. 7,277,721.

(30) Foreign Application Priority Data

| Jul. 24, 2001 | (JP) | 2001-223652 |
| Aug. 1, 2001 | (JP) | 2001-233872 |
| Aug. 10, 2001 | (JP) | 2001-245100 |

(51) Int. Cl.
*H04B 7/00* (2006.01)

(52) U.S. Cl. .................. 455/522; 455/69; 455/128; 455/67.13

(58) Field of Classification Search ................ 455/521, 455/69, 126, 67.11, 127.1, 68, 70, 574, 136, 455/226.3, 222, 522, 67.13; 370/335, 342, 370/311
See application file for complete search history.

(56) References Cited

U.S. PATENT DOCUMENTS 5,056,109 A * 10/1991 Gilhousen et al. ............. 455/69

(Continued)

FOREIGN PATENT DOCUMENTS

JP 08-32514 2/1996

(Continued)

*Primary Examiner*—John Lee
(74) *Attorney, Agent, or Firm*—Oblon, Spivak, McClelland, Maier & Neustadt, L.L.P.

(57) ABSTRACT

A transmission power control device is provided that includes: a transmission loss calculator that calculates a transmission loss in the electric wave transmission path between a mobile station and each base station; and a transmission power control information determiner that determines which transmission power control information is to be used in a transmission power control operation at the mobile station, based on transmission power control information transmitted from each base station to the mobile station and the transmission loss in the transmission path between the mobile station and each base station calculated by the transmission loss calculator. This transmission power control device may further include an autonomous controller that increases transmission power from a current value in accordance with predetermined characteristics, regardless of transmission power control information from another communication device, when reception signal quality has become lower than a predetermined quality level. With this structure, after synchronization with a signal from the base station is established at the mobile station, the transmission power is controlled to increase from the initial value in accordance with the predetermined characteristics, regardless of the transmission power control information transmitted from the base station.

6 Claims, 22 Drawing Sheets

U.S. PATENT DOCUMENTS

| | | | |
|---|---|---|---|
| 5,590,409 A * | 12/1996 | Sawahashi et al. | 455/69 |
| 6,026,081 A * | 2/2000 | Hamabe | 455/69 |
| 6,269,239 B1 * | 7/2001 | Hashem et al. | 455/69 |
| 6,414,948 B1 * | 7/2002 | Sato | 370/335 |
| 6,615,054 B2 | 9/2003 | Terry et al. | |
| 6,963,753 B1 * | 11/2005 | Hamabe | 455/522 |
| 2001/0033558 A1 * | 10/2001 | Matsuki | 370/335 |

FOREIGN PATENT DOCUMENTS

| | | |
|---|---|---|
| JP | 11-122167 | 4/1999 |
| JP | 11-220774 | 8/1999 |
| JP | 2000-59297 | 2/2000 |
| JP | 2000-244391 | 9/2000 |
| JP | 2000-261374 | 9/2000 |
| JP | 2001-54153 | 2/2001 |
| JP | 2001-177471 | 6/2001 |
| WO | WO 98/029970 | 7/1998 |
| WO | WO 98/030052 | 7/1998 |
| WO | WO 98/056196 | 12/1998 |
| WO | 99/37111 | 7/1999 |
| WO | 00/36762 | 6/2000 |
| WO | WO 00/49728 | 8/2000 |

* cited by examiner

FIG.5

| A | B | C |
|---|---|---|
| 1 | 1 | 1 |
| 1 | 0 | — |
| 0 | 1 | MAINTAIN |
| 0 | 0 | 0 |

TRANSMISSION POWER CONTROL DEVICE AND METHOD, MOBILE STATION, AND COMMUNICATION DEVICE IN MOBILE COMMUNICATION SYSTEM

FIELD OF THE INVENTION

The present invention relates to transmission power control devices and methods, mobile stations, and communication devices in mobile communication systems, and, more particularly, to a transmission power control device and method by which transmission power control is performed on the transmission power of a mobile station that performs wireless communication with a plurality of base stations in a mobile communication system, and a mobile station and a communication device in the mobile communication system. The present invention also relates to a transmission power control method and device by which transmission power control is performed on the transmission power of a communication device that performs wireless transmission and reception with another communication device and transmits transmission power control information that is determined based on reception signal quality and is to be used in a transmission power control operation in the other communication device.

BACKGROUND OF THE INVENTION

Japanese Laid-Open Patent Application No. 9-312609 discloses a method of controlling transmission power in a soft handover process of a mobile station that performs radio communication with a plurality of base stations in a CDMA mobile communication system.

In accordance with this transmission power control method, each of the two base stations that are to receive signals from the mobile station measures the signal-to-interference plus noise power ratio (hereinafter referred to as the "reception SINR", and generates transmission power control bits (each of which represents a power increase or a power decrease) so that the reception SINR approaches a target SINR. The transmission power control bits are then transmitted from each base station to the mobile station. The mobile station measures the reception SINR with respect to each signal transmitted from the two base stations. Regarding the reception SINR of each base station as the reliability level of each transmission power control bit transmitted from the corresponding base station, the mobile station performs a transmission power control operation (a power increasing operation, a power decreasing operation, or a power maintenance operation) based on the transmission power control bits transmitted from each base station.

More specifically, if the reception SINR of one of the base stations is equal to or lower than a predetermined reference level, the transmission power control bits transmitted from the base station are regarded as unreliable and therefore are ignored. Instead, a transmission power control operation (a power increasing operation or a power decreasing operation) is performed based on the transmission power control bits transmitted from the other base station. If the reception SINRs of both base stations are equal to or lower than the predetermined reference level, the transmission power control bits from both base stations are regarded as unreliable, and the current transmission power is maintained regardless of those transmission power control bits. If the reception SINRs of both base stations are higher than the predetermined reference level, a transmission power control operation is performed based on such transmission power control bits as to decrease the transmission power.

By the above transmission power control method, a transmission power control operation is performed at the mobile station in such a manner that the transmission power is reduced based on the transmission power control bits having the higher reliabilities among the transmission power control bits transmitted from each base station. Thus, efficient transmission power control can be performed while a reasonable communication quality level is maintained.

The mobile station performs maximum-rate combining on the reception SINRs measured with respect to the base stations to obtain a composite SINR. Based on the composite SINR, the mobile station generates and transmits transmission power control bits to each base station. Based on the transmission power control bits transmitted from the mobile station, each base station performs a transmission power control operation.

In the above transmission power control operation at a mobile station in a mobile communication system, the reception SINR of each base station is regarded as reliable, based on the transmission power control bits transmitted from the corresponding base station. However, the reception SINR is measured at the mobile station based on a signal transmitted from each base station also performing such a transmission power control operation as to maintain the signal reception quality (the composite SINR) at a certain level at the mobile station. Because of this, the reception SINR does not necessarily reflect the true conditions (such as the fading condition and the distance) of the electric wave transmission path between the mobile station and each base station. Particularly, in a soft handover process, the conditions of the electric wave transmission path between the moving mobile station and each base station constantly vary with time. Therefore, it is preferable to take into consideration the true conditions of the electric wave transmission path in a transmission power control operation at the mobile station. In this manner, the transmission power at the mobile station can be reduced, while the predetermined communication quality is maintained.

Conventionally, a mobile station and a base station that perform radio transmission and reception of signals with each other in a CDMA mobile communication system each control the transmission power in the following manner.

The mobile station measures the signal-to-interference plus noise power ratio (hereinafter referred to as the "reception SINR") with respect to each reception signal from the base station, and regards the reception SINR as the reception signal quality. Based on the difference between the reception SINR and a target SINR, the mobile station generates transmission power control bits (each of which represents a power increase or a power decrease). The mobile station then transmits the transmission power control bits (transmission power control information) to the base station.

The base station controls the transmission power based on the transmission power control bits transmitted from the mobile station, while measuring the reception SINR with respect to each reception signal from the mobile station. Based on the difference between the reception SINR and a target SINR, the base station generates transmission power control bits, and transmits the transmission power control bits to the mobile station.

The mobile station generates the transmission power control bits to be transmitted to the base station, as described above, while controlling the transmission power at the mobile station based on the transmission power control bits transmitted from the base station.

By the above transmission power control operations at the mobile station and the base station, the transmission power at the mobile station is controlled so that the reception SINR at the base station approaches the target SINR. Also, the transmission power at the base station is controlled so that the reception SINR at the mobile station approaches the target SINR. Even if there are changes in the conditions (such as the distance and the fading condition) of the electric wave transmission path between the mobile station and the base station, the mobile station and the base station can perform signal transmission and reception with a stable reception signal quality, but without unnecessary transmission power consumption, by the above transmission power control operations.

When the above transmission power control operations are properly performed at the mobile station and the base station, each reception SINR at the mobile station and the base station fluctuates within a relatively narrow range, with the target SINR being in the middle, which is shown as the "NORMAL" region in FIG. 20. However, even when the above transmission power control operations are properly performed, the reception SINR might continuously decrease and move away from the target SINR, as shown in the "ABNORMAL" region of FIG. 20. The reasons of the continuous decrease of reception SINR are considered as follows.

In a case where the reception SINR at the mobile station keeps decreasing, the transmission power control operation based on the transmission power control bits generated from the mobile station is not properly performed at the base station. One of the reasons of this is that the reception quality of the transmission power control bits transmitted from the mobile station through the uplink is not adequate at the base station, and, as a result, a transmission power control operation based on different values from the values represented by the transmission power control bits generated from the mobile station is performed at the base station. The cause of this problem resides in that the transmission power control operation at the mobile station transmitting transmission power control bits is not necessarily performed in such a manner as to maintain the reception quality of the transmission power control bits at a predetermined quality level at the base station.

In the above situation, the reception quality of the transmission power control bits transmitted from the base station deteriorates at the mobile station due to the decrease of the reception SINR at the mobile station. As a result, an improper transmission power control operation is performed at the mobile station. Due to the improper transmission power control operation, the reception quality of the transmission power control bits transmitted from the mobile station deteriorates at the base station. Furthermore, due to the deterioration of the reception quality of the transmission power control bits at the base station, a transmission power control operation is not properly performed at the base station, resulting in a further decrease of the reception SINR at the mobile station. If this situation continues, the communication between the mobile station and the base station might be terminated.

Also in a conventional CDMA mobile communication system, a base station and a mobile station perform transmission and reception of various types of information (such as the information as to inherent spread codes to be used, and the information as to the signal format of each individual channel) through a common control channel, before a start of information data transmission between the base station and the mobile station. Transmission and reception of signals in a predetermined format are then performed through individual channels determined based on the above various types of information, so as to establish signal synchronization between the two stations. The process of establishing synchronization may be carried out through the procedures shown in FIG. 21.

As shown in FIG. 21, a base station 200 starts transmission of signals in a predetermined format (downlink transmission) (①). The signals in the downlink transmission contain transmission power control bits (transmission power control information representing a power increase or a power decrease) that exhibit a predetermine pattern. A mobile station 100 performs synchronization initiation for the signals from the base station 200 (②). Through the synchronization initiation, synchronization is established (downlink synchronization establishment) (③). After confirming the establishment of synchronization, the mobile station 100 starts transmission of signals in a predetermined format (uplink transmission) (④), while performing a transmission power control operation based on the transmission power control bits that exhibit the predetermined pattern.

The base station 200 performs synchronization initiation for signals transmitted from the mobile station 100 (⑤). Through the synchronization initiation, synchronization is established at the base station 200 (uplink synchronization establishment) (⑥). A certain period of time is required from the start of signal transmission (①) from the base station 200 till the establishment of uplink synchronization (⑥) at the base station 200.

In the above process of establishing synchronization, the transmission power control operation at the mobile station 100 may be performed as shown in FIG. 22.

Initially, the base station 200 needs to start downlink transmission while not receiving signals from the mobile station 100 (see ① of FIG. 21). Therefore, the base station 200 transmits transmission power control bits that represent a pattern of a constant power increase (a pattern only consisting of bits of "1") as well as the signals. After confirming the establishment of downlink synchronization (③ of FIG. 21), the mobile station 100 starts increasing the transmission power at time t1 for the uplink transmission start (equivalent to ④ of FIG. 21). The mobile station 100 then gradually increases the transmission power from an initial value P0 determined from a transmission loss or the like, in accordance with the transmission power control bits (1, 1, 1, 1, . . . ).

The transmission power control cycle in accordance with the above transmission power control bits is much shorter than a time required for establishing synchronization between the mobile station 100 and the base station 200. Therefore, once the transmission power control value reaches the maximum value Pmax in the transmission power control operation in accordance with the above transmission power control bits, the transmission power is maintained at the maximum value Pmax.

In this manner, the mobile station 100 performs such a transmission power control operation as to increase the transmission power to the maximum value Pmax, while transmitting signals. After uplink synchronization is established at the base station 200 through the synchronization initiation of the signals (at time t2), the base station 200 measures the signal-to-interference plus noise power ratio (hereinafter referred to as the "reception SINR) with respect to each signal from the base station 100, regarding the reception SINR as the reception signal quality. Based on the difference between the reception SINR and a target SINR that is set independently of the reception SINR, the base station 200 generates transmission power control bits (each of which represents a power increase or a power decrease). The base station 200 then transmits the transmission power control bits to the mobile station 100 (downlink transmission).

At the time when uplink synchronization is established at the base station 200 (at time t2), the mobile station 100 is performing such a transmission power control operation as to increase the transmission power to the maximum value Pmax. Because of this, the reception SINR from the mobile station 100 is much higher than the target SINR (excessive quality). Immediately after the uplink synchronization is established, transmission power control bits "0" representing a continuous power decrease are normally generated.

After the uplink synchronization is established at the base station 200 (after time t2), the mobile station 100 transmits signals (uplink transmission) while performing a transmission power control operation based on the transmission power control bits generated from the base station 200 in the above manner (closed-loop control). As a result, the transmission power at the mobile station 100 is controlled so that the reception SINR at the base station 200 can be maintained at the target SINR. In this situation, the mobile station 100 starts transmitting signals including information data in a predetermined timing.

In the above transmission power control operation at the mobile station 100 before information data transmission is started between the base station 200 and the mobile station 100, the mobile station 100 transmits signals while controlling the transmission power to increase rapidly in accordance with the transmission power control bits (1, 1, 1, 1, ... ) representing a continuous power increase transmitted from the base station 200, after downlink synchronization with each signal from the base station 200 is established at the mobile station 100 (after time t1 in FIG. 22). By this transmission power control operation, the reception quality of signals from the mobile station 100 is rapidly improved at the base station 200. Thus, the downlink synchronization at the base station 200 can be established in an earlier stage.

In the signal transmission and reception process between the base station 200 and the mobile station 100, however, the transmission power at the mobile station 100 should only be maintained at such a transmission power value that the reception signal quality (the reception SINR, for example) can be maintained at the target quality (the target SINR, for example) (see the transmission power value after time t2 in FIG. 22). If the transmission power value at the mobile station 100 is increased to the maximum value Pmax or increased to a value close to the maximum value Pmax despite the transmission power at the mobile station 100 being controlled in such a manner as to only maintain the reception signal quality at the target quality at the base station 200, the transmission power at the mobile station 100 temporarily becomes excessive at the time immediately before information data transmission is started between the base station 200 and the mobile station 100. This results in unnecessary power consumption through the uplink, and unnecessary radio resource consumption at the base station 200.

DISCLOSURE OF THE INVENTION

Therefore, a first object of the present invention is to provide a transmission power control device that can perform a transmission power control operation for a mobile device, taking into consideration the conditions of the electric wave transmission path between the mobile station and each base station in a system in which the mobile station performs radio communication with a plurality of base stations. A second object of the present invention is to provide a mobile station that can be properly controlled by such a transmission power control device that performs a transmission power control operation for the mobile station.

A third object of the present invention is to provide a transmission power control method and device that can prevent a continuous decrease of reception signal quality below a predetermined quality level in a communication device that performs radio transmission and reception of signals with another communication device and transmits transmission power control information that are determined based on the reception signal quality and are to be used in a transmission power control operation in the other communication device. A fourth object of the present inventions is to provide a communication device equipped with such a transmission power control device.

Further, a fifth object of the present invention is to provide a transmission power control method and device that can perform a control operation to reduce unnecessary power transmission power consumption at a mobile station, and help to establish synchronization in an earliest possible stage before information data transmission is started between the mobile station and a base station. A sixth object of the present invention is to provide a mobile station that can be properly controlled by such a transmission power control method as to control the transmission power of the mobile station.

To achieve the first object, the present invention provides a transmission power control device that controls the transmission power of a mobile station based on transmission power control information supplied from each base station to the mobile station in a mobile communication system in which a plurality of base stations to be radio-connected to the base station each supply the mobile station the transmission power control information that is generated based on reception signal quality, as claimed in claim 1. This transmission power control device includes: a transmission loss calculator that calculates a transmission loss in an electric wave transmission path between the mobile station and each base station, based on a predetermined signal transmitted from each base station with a fixed transmission power; and a transmission power control information determiner that determines which transmission power control information is to be used in a transmission power control operation at the mobile station, based on the transmission power control information that is supplied from each base station to the mobile station and the transmission loss in the electric wave transmission path between the mobile station and each base station that is calculated by the transmission loss calculator.

In this transmission power control device, the predetermined signal, based on which the transmission loss in the electric wave transmission path between the mobile station and each base station is calculated, is transmitted from each base station with a fixed transmission power. Accordingly, the transmission loss calculated in this manner accurately represents the conditions (such as the length and the fading condition) of the electric wave transmission path between the mobile station and each corresponding base station. Based on the transmission loss in the electric wave transmission path between each base station and the mobile station as well as the transmission power control information transmitted from each base station to the mobile station, which transmission power control information should be used in a transmission power control operation at the mobile station is determined.

The transmission power control information determination is performed based on the conditions of the electric wave transmission path between the mobile station and each base station, while weighting is performed on the transmission power control information in accordance with the conditions of each corresponding electric wave transmission path. Taking this aspect into consideration, in the transmission power control device of the present invention, the transmission power control information determiner may include: a weight corrector that performs weighting on the transmission power control information supplied from each base station to the mobile station, so that a greater weight is given to the transmission power control information supplied from a base station having a smaller transmission loss in the electric wave transmission path to the mobile station, the weight corrector thereby generating weight correction control information; and a combiner that combines the weight correction control information corresponding to the transmission power control information from the base stations, and thereby generates composite transmission power control information, the weight correction control information having been generated from the weight corrector, as claimed in claim 2. In this transmission power control device, the transmission power control information determiner determines which transmission power control information is to be used in a transmission power control operation at the mobile station, based on the composite transmission power control information generated from the combiner.

In a case where the transmission power control information transmitted from each base station can contain a first value representing a control status of a power increase and a second value representing a control status of a power decrease, and where the mobile station receives the transmission power control information from each base station as a soft decision value, the above transmission power control information determiner may include a hard decision unit that performs a hard decision on the value of the composite transmission power control information generated from the combiner, using a predetermined threshold value, as claimed in claim 3. This transmission power control information determiner determines which transmission power control information is to be used in a transmission power control operation at the mobile station, based on the result of the hard decision.

It is more preferable to minimize unnecessary power consumption by a transmission power control operation. Therefore, in the above transmission power control device of the present invention, the predetermined threshold value used by the hard decision unit is closer to the first value by a predetermined amount from the middle value between the first value and the second value included in the transmission power control information transmitted from each of the base stations, as claimed in claim 4.

In the above transmission power control device, the predetermined threshold value is closer to the first value representing a control status of a power increase by a predetermined amount. Accordingly, the hard decision unit using the threshold value is more likely to determine from the value of the composite transmission power control information that the control status is not to increase transmission power. As a result, transmission power control can be performed with a lower electric power.

In a case where the transmission power control information transmitted from each of the base stations can contain a first value that represents a control status of a power increase and a second value that represents a control status of a power decrease, and where the mobile station receives the transmission power control information transmitted from each of the base stations as a soft decision value, the above transmission power control information determiner may include: a first hard decision unit that performs a hard decision on the value of the composite transmission power control information generated from the combiner, using a first threshold value; a second hard decision unit that performs a hard decision on the value of the composite transmission power control information, using a second threshold value that is different from the first threshold value; and a control information generator that generates first control information that represents a control status of a power increase, second control information that represents a control status of a power decrease, or third control information that represents a control status of power maintenance, based on a decision result of the first hard decision unit and a decision result of the second hard decision unit, as claimed in claim 5. This transmission power control information determiner determines that the control information generated from the control information generator is to be used as the transmission power control information in a transmission power control operation at the mobile station.

In this transmission power control device, the value of the composite transmission power control information may be greater than both the first and second threshold values, may be smaller than both the first and second threshold values, or may come between the first threshold value and the second threshold value. These three possible situations can be associated with the first control status, the second control status, and the third control status.

It is more preferable that the transmission power control information transmitted from a base station having the electric wave transmission path to the mobile station in poor condition is not taken into consideration in the process of determining which transmission power control information should be used in a transmission power control operation at the mobile station. Therefore, in the transmission power control device of the present invention, the transmission power control information determiner may include a selector that selects the transmission power control information transmitted from the base station having the smallest transmission loss in the electric wave transmission path to the mobile station, the transmission loss being calculated by the transmission loss calculator, as claimed in claim 6. In this transmission power control device, the transmission power control information determiner determines which transmission power control information is to be used in a transmission power control operation at the mobile station, based on the transmission power control information selected by the selector.

Like the transmission power control information determiner of any of claims 3 through 5, this transmission power control information determiner can have the same structure.

It is more preferable to minimize power consumption by a transmission power control operation. Therefore, in the transmission power control device of the present invention, the transmission power control information determiner may include: a weight corrector that performs weighting on the transmission power control information supplied from each base station to the mobile station, so that a greater weight is given to the transmission power control information supplied from a base station having a smaller transmission loss in the electric wave transmission path to the mobile station, the weight corrector thereby generating weight correction control information; and a control information generator that generates control information based on the weight correction control information designed to give priority to correction information closer to the transmission power control information representing a control status of a power decrease, the weight correction control information being selected from the weight correction control information that are generated from the weight corrector and correspond to the transmission power control information transmitted from the base stations. This transmission power control information determiner determines that the control information generated from the control information generator is to be used as the transmission power control information in a transmission power control operation at the mobile station.

In a case where the transmission power control information transmitted from each of the base stations can contain a first value that represents a control status of a power increase and a second value that represents a control status of a power decrease, and where the mobile station receives the transmission power control information transmitted from each of the base stations as a soft decision value, the above control information generator may include: a hard decision unit that performs a hard decision on the value of the weight correction control information that are generated from the weight corrector and correspond to the transmission power control information transmitted from each of the base stations, using a predetermined threshold value; and a selector that selects one of the hard decision results corresponding to the transmission power control information transmitted from the base stations, so that priority can be given to the hard decision result representing a control status of a power decrease. This control information generator generates the control information based on the hard decision result selected by the selector.

As described above, it is more preferable to give priority to the transmission power control information transmitted from a base station having the electric wave transmission path to the mobile station in good condition, and to minimize unnecessary power consumption. Therefore, in the transmission power control device of the present invention, the transmission power control information determiner may include: a transmission loss decision unit that determines whether each transmission loss calculated by the transmission loss calculator is smaller than a predetermined transmission loss; and a control information generator that, when the transmission loss decision unit determines that one transmission loss is smaller than the predetermined transmission loss, generates control information based on the transmission power control information from the base station corresponding to the transmission loss determined to be smaller than the predetermined transmission loss, when the transmission loss decision unit determines that two or more transmission losses are smaller than the predetermined transmission loss, generates control information based on the transmission power control information designed to give priority to the transmission power control information closer to the transmission power control information representing a control status of a power decrease among the transmission power control information transmitted from the base stations corresponding to the two or more transmission losses, and, when the transmission loss decision unit determines that all the transmission losses are not smaller than the predetermined transmission loss, generates control information based on the transmission power control information designed to give priority to the transmission power control information closer to the transmission power control information representing a control status of a power decrease among the I transmission power control information transmitted from the base stations. This transmission power control information determiner determines that the control information generated from the control information generator is to be used as the transmission power control information in a transmission power control operation at the mobile device.

To achieve the first object, the present invention also provides a transmission power control device that controls transmission power of a mobile station based on transmission power control information transmitted from each of the base stations to the mobile station in a mobile communication system in which each of the base stations to be radio-connected to the mobile station supplies the mobile station the transmission power control information that is determined based on reception signal quality. This transmission power control device includes: a transmission loss calculator that calculates a transmission loss in the electric wave transmission path between the mobile station and each of the base stations, based on a predetermined signal transmitted from each of the base stations with a fixed transmission power; a fading condition measurer that measures a fading condition of the mobile station; a fading condition determiner that determines whether the fading condition of the mobile station measured by the fading condition measurer is better than a predetermined condition; and a switch controller that validates a first transmission power control information determiner when the fading condition determiner determines that the fading condition of the mobile station is better than the predetermined condition, and validates a second transmission power control information determiner when the fading condition determiner determines that the fading condition of the mobile station is not better than the predetermined condition. In this transmission power control device, the first transmission power control information determiner includes: a weight corrector that performs weighting on the transmission power control information transmitted from each of the base stations to the mobile station, so that a greater weight is given to the transmission power control information transmitted from a base station having a smaller transmission loss in the electric wave transmission path to the mobile station, the weight corrector thus generating weight correction control information; and a combiner that combines the weight correction control information that are generated from the weight corrector and correspond to the transmission power control information transmitted from the base stations, the combiner thus generating composite transmission power control information. This first transmission power control information determiner determines which transmission power control information is to be used in a transmission power control operation at the mobile station, based on the composite transmission power control information generated from the combiner. The second transmission power control information determiner includes a selector that selects the transmission power control information transmitted from the base station having the smallest transmission loss in the electric wave transmission path to the mobile station, the selection being made from the transmission power control information transmitted from the base stations to the mobile station. This second transmission power control information determiner determines which transmission power control information is to be used in a transmission power control operation at the mobile station, based on the transmission power control information selected by the selector.

In the above transmission power control device, when the fading condition of the mobile station is better than the predetermined condition, which transmission power control information should be used in a transmission power control operation at the mobile station is determined based on the transmission loss that accurately represents the conditions of the electric wave transmission path between each base station and the mobile station, as well as on the transmission power control information transmitted from the base stations to the mobile station. On the other hand, when the fading condition of the mobile station is not better than the predetermined condition, which transmission power control information should be used in a transmission power control operation at the mobile station is determined based on the transmission power control information transmitted from the base station having the smallest transmission loss in the electric wave transmission path to the mobile station. Accordingly, the transmission power control information transmitted from a base station having the electric wave transmission path in poor condition is not taken into consideration in the process of determining which transmission power control information should be used in a transmission power control operation at the mobile station.

To achieve the first object, the present invention further provides a transmission power control device that controls transmission power of a mobile station based on transmission power control information transmitted from each of the base stations to the mobile station in a mobile communication system in which each of the base stations to be radio-connected to the mobile station supplies the mobile station the transmission power control information that is determined based on reception signal quality. This transmission power control device includes: a transmission path quality measurer that measures the quality of the transmission path between the mobile station and each of the base stations, based on a predetermined signal transmitted from each of the base stations with a fixed transmission power, the quality of the transmission path being to be used for determining to which base station the mobile station is to be radio-connected; and a transmission power control information determiner that determines which transmission power control information is to be used in a transmission power control operation at the mobile station, based on the transmission power control information transmitted from each of the base stations to the mobile station and the quality of the transmission path between the mobile station and each of the base stations measured by the transmission path quality measurer.

In this transmission power control device, which transmission power control information should be used in a transmission power control operation at the mobile station is determined based on the transmission path quality that accurately represents the conditions of the electric wave transmission path between each base station and the mobile station, as well as on the transmission power control information transmitted from each base station to the mobile station. Furthermore, the quality of the transmission path between the mobile station and each base station measured in the above manner is originally used for determining to which base station the mobile station should be radio-connected. Accordingly, the structure of the transmission power control device can be simplified.

The transmission path quality measured based on a predetermined signal transmitted from each base station with a fixed transmission power can represent the distance and the facing condition between the mobile station and each base station, and is not limited to any particular form, as long as being used for determining to which base station the mobile station is to be radio-connected. For instance, it is possible to use the transmission losses, the reception level of the predetermined signal at the mobile station, or the signal-to-interference plus noise power ratio (reception SINR) measured based on the predetermined signal.

To achieve the first object, the present invention also provides a transmission power control device that controls transmission power of a mobile station based on a soft decision value of transmission power control information transmitted from each of the base stations to the mobile station in a mobile communication system in which each of the base stations to be radio-connected to the mobile station supplies the mobile station the transmission power control information that can contain a first value representing a control status of a power increase and a second value representing a control status of a power decrease that are determined based on reception signal quality. This transmission power control device includes: a transmission path quality measurer that measures the quality of the transmission path between the mobile station and each of the base stations, based on a predetermined signal transmitted from each of the base stations with a fixed transmission power; and a transmission power control information determiner that determines which transmission power control information is to be used in a transmission power control operation at the mobile station, based on the soft decision value of the transmission power control information transmitted from each of the base stations to the mobile station and the quality of the transmission path between each of the base stations and the mobile station measured by the transmission path quality measurer. In this transmission power control device, the transmission power control information determiner includes: a weight corrector that performs weighting on the soft decision value of the transmission power control information transmitted from each of the base stations to the mobile station, so that a greater weight is given to the transmission power control information of a base station having a higher quality in the transmission path to the mobile station, the weight corrector thus generating weight correction control information; a combiner that combines the weight correction control information that are generated from the weight corrector and correspond to the transmission power control information transmitted from the base stations, the combiner thus generating composite transmission power control information; and a hard decision unit that performs a hard decision on the value of the composite transmission power control information generated from the combiner, using a threshold value that is closer to the first value by a predetermined amount from the middle value between the first value and the second value that can be contained in the transmission power control information transmitted from each of the base stations. This transmission power control information determiner determines which transmission power control information is to be used in a transmission power control operation at the mobile station, based on the result of the hard decision.

The above transmission path quality between the mobile station and each base station measured based on the predetermined signal transmitted from each base station with a fixed transmission power is not limited to any particular form, as long as the transmission path quality represents the conditions such as the distance and the fading condition between the mobile station and each of the base stations. For instance, it is possible to use transmission losses, the reception level of the predetermined signal at the mobile station, or the signal-to-interference plus noise power ratio (the reception SINR) measured based on the predetermined signal.

To achieve the first object, the present invention further provides a transmission power control device that controls transmission power of a mobile station based on a soft decision value of transmission power control information transmitted from each of the base stations to the mobile station in a mobile communication system in which each of the base stations to be radio-connected to the mobile station supplies the mobile station the transmission power control information that can contain a first value representing a control status of a power increase and a second value representing a control status of a power decrease that are determined based on reception signal quality. This transmission power control device includes: a transmission path quality measurer that measures the quality of the transmission path between the mobile station and each of the base stations, based on a predetermined signal transmitted from each of the base stations with a fixed transmission power; and a transmission power control information determiner that determines which transmission power control information is to be used in a transmission power control operation at the mobile station, based on the soft decision value of the transmission power control information transmitted from each of the base stations to the mobile station and the quality of the transmission path between each of the base stations and the mobile station measured by the transmission path quality measurer. In this transmission power control device, the transmission power control information determiner includes: a weight corrector that performs weighting on the soft decision value of the transmission power control information transmitted from each of the base stations to the mobile station, so that a greater weight is given to the transmission power control information of a base station having a higher quality in the transmission path to the mobile station, the weight corrector thus generating weight correction control information; a combiner that combines the weight correction control information that are generated from the weight corrector and correspond to the transmission power control information transmitted from the base stations, the combiner thus generating composite transmission power control information; a first hard decision unit that performs a hard decision on the value of the composite transmission power control information generated from the combiner, using a first threshold value; a second hard decision unit that performs a hard decision on the value of the composite transmission power control information, using a second threshold value that is different from the first threshold value; and a control information generator that generates first control information representing a control status of a power increase, second control information representing a control status of a power decrease, or third control information representing a control status of power maintenance, based on a decision result of the first hard decision unit and a decision result of the second hard decision unit. This transmission power control information determiner determines that the control information generated from the control information generator is to be used as the transmission power control information in a transmission power control operation at the mobile station.

To achieve the first object, the present invention also provides a transmission power control device that controls transmission power of a mobile station based on transmission power control information transmitted from each of the base stations to the mobile station in a mobile communication system in which each of the base stations to be radio-connected to the mobile station supplies the mobile station the transmission power control information that is determined based on reception signal quality. This transmission power control device includes: a transmission path quality measurer that measures the quality of the transmission path between the mobile station and each of the base stations, based on a predetermined signal transmitted from each of the base stations with a fixed transmission power; a fading condition measurer that measures a fading condition of the mobile station; a fading condition determiner that determines whether the fading condition of the mobile station measured by the fading condition measurer is better than a predetermined fading condition; and a switch controller that validates a first transmission power control information determiner when the fading condition determiner determines that the fading condition of the mobile station is better than the predetermined condition, and validates a second transmission power control information determiner when the fading condition determiner determines that the fading condition of the mobile station is not better than the predetermined condition. In this transmission power control device, the first transmission power control information determiner includes: a weight corrector that performs weighting on the transmission power control information transmitted from each of the base stations to the mobile station, so that a greater weight is given to the transmission power control information transmitted from a base station having a higher quality in the transmission path to the mobile station, the weight corrector thus generating weight correction control information; and a combiner that combines the weight correction control information that are generated from the weight corrector and correspond to the transmission power control information transmitted from the base stations, the combiner thus generating composite transmission power control information. This first transmission power control information determiner determines which transmission power control information is to be used in a transmission power control operation at the mobile station, based on the composite transmission power control information generated from the combiner. The second transmission power control information determiner includes a selector that selects the transmission power control information transmitted from the base station having the highest quality in the transmission path to the mobile station, the selection being made from the transmission power control information transmitted from the base stations to the mobile station, and the transmission path quality being measured by the transmission path quality measurer. This second transmission power control information determiner determines which transmission power control information is to be used in a transmission power control operation at the mobile station, based on the transmission power control information selected by the selector.

To achieve the second object, the present invention provides a mobile station that is to be radio-connected to base stations in a mobile communication system, and includes: a signal combiner that combines signals transmitted from the base stations, and thereby generates a composite signal; an information restorer that restores downlink transmission information from the composite signal generated from the signal combiner; a reception quality calculator that calculates reception quality of the composite signal generated from the signal combiner; a transmission power control information generator that generates transmission power control information used for controlling transmission power of each of the base stations, based on the reception quality calculated by the reception quality calculator; a transmission power control information transmitter that transmits the transmission power control information generated from the transmission power control information generator to each of the base stations; and one of the transmission power control devices described above.

To achieve the third object, the present invention provides a transmission power control method of controlling transmission power of a communication device based on predetermined information supplied from another communication device, the communication device performing radio transmission and reception with the other communication device and transmitting transmission power control information that is to be used in a transmission power control operation in the other communication device and is determined based on reception signal quality. This transmission power control method includes the steps of: determining whether the reception signal quality has become lower than a predetermined quality; and autonomously controlling the transmission power by increasing the transmission power in accordance with predetermined characteristics, regardless of the predetermined information supplied from the other communication device, when the reception signal quality is determined to have become lower than the predetermined quality in the quality determining step, the transmission power being increased from the transmission power value that is observed at the time of the determination.

In this transmission power control method, when the reception signal quality at the communication device becomes lower than the predetermined quality, the transmission power of the communication device is autonomously increased in accordance with the predetermined characteristics, regardless of the predetermined information supplied from the other communication device.

The transmission power of the communication device is increased in this manner. Accordingly, the transmission power control information that is determined based on the reception signal quality and is to be used in a transmission power control operation in the other communication device can be received by the other communication device with an improved reception quality. As a result, the other communication device can perform a transmission power control operation based on the transmission power control information of the improved quality.

The above reception signal quality is not limited to any particular form, as long as representing the reception quality of the signal controlled by and transmitted from the other communication device to the communication device. For instance, it is possible to use the reception level of the signal or the SINR (signal-to-interference plus noise power ratio) representing the ratio of the signal components to interference signal components and noise.

Also, the predetermined characteristics of the increase of the transmission power may be of any type, as long as the transmission power does not become lower than the transmission power value that is observed at the time of the determination. For instance, with the predetermined characteristics, the transmission power may be gradually increased, or may be increased stepwise up to a certain level and then maintained at the certain level. Even if the transmission power value temporarily drops during the gradually increasing process, there will be no problem as long as the transmission power value after the dropping is not smaller than the transmission power value that is observed at the time of the determination.

The predetermined information that is supplied from the other communication device and is to be used in a transmission power control operation of the communication device is not limited to any particular form, as long as the information is transmitted from the other communication device as information to be used in a transmission power control operation of the communication device. For instance, the predetermined information may be transmission power control information generated based on the reception quality of a signal from the communication device that is measured by the other communication device, information as to the reception quality of a signal from the communication device that is measured by the other communication device, or the like.

In a case where the communication device transmits such transmission power control information to the other communication device that a reception signal quality value approaches a target reception signal quality value, the reception quality can be easily determined. In view of this, the above quality determining step may include the step of determining whether the reception signal quality value has become smaller than a first threshold value. When the reception signal quality value is determined to have become smaller than the first threshold value in the first threshold value determining step, the reception signal quality is determined to have become lower than the predetermined quality in the quality determining step.

From the same point of view as the above, the quality determining step may include the steps of: calculating a difference value by subtracting the reception signal quality value from the target reception signal quality value; and determining whether the difference value obtained in the difference value calculating step is equal to or greater than a second threshold value. When the difference value is determined to be equal to or greater than the second threshold value in the second threshold value determining step, the reception signal quality is determined to have become lower than the predetermined quality in the quality determining step.

In a case where the communication device transmits such transmission power control information to the other communication device that a reception signal quality value approaches a target reception signal quality value that is controlled in accordance with a predetermined parameter, from the same point of view as the above, the quality determining step may include the steps of: determining whether the reception signal quality value has becomes smaller than a first threshold value; calculating a difference value by subtracting the reception signal quality value from the target reception signal quality value; and determining whether the difference value obtained in the difference value calculating step is equal to or greater than a second threshold value. When the reception signal quality value is determined to have become smaller than the first threshold value in the first threshold value determining step, or when the difference value is determined to be equal to or greater than the second threshold value in the second threshold value determining step, the reception signal quality is determined to have become lower than the predetermined quality in the quality determining step.

The predetermined parameter, based on which the target reception signal quality value is controlled, is not limited to any particular form, and the above structure is valid when the target reception signal quality value is not a fixed value but a variable value that varies with the control operation. For instance, the predetermined parameter may be the error rate in the transmission information contained in reception signals received by the communication device.

The above autonomous control step may include the steps of: generating such autonomous transmission power control information as to increase the transmission power in accordance with the predetermined characteristics; and switching control operations from a transmission power control operation based on transmission power control information supplied from the other communication device to a transmission power control operation based on the autonomous transmission power control information, when the reception signal quality is determined to have become lower than the predetermined quality in the quality determining step.

It is more preferable to prevent such a situation that the transmission power is unnecessarily increased without any improvement in the reception signal quality. Therefore, in the transmission power control method of the present invention, the autonomous control step may include the steps of: determining whether a transmission power increase amount has reached a predetermined amount while the transmission power is being increased in accordance with the predetermined characteristics; and stopping the autonomous control of increasing the transmission power in accordance with the predetermined characteristics, when the transmission power increase amount is determined to have reached the predetermined amount in the determining step.

To achieve the third object, the present invention provides a transmission power control device that controls transmission power of a communication device based on predetermined information supplied from another communication device, the communication device performing radio transmission and reception with the other communication device and transmitting transmission power control information that is to be used in a transmission power control operation in the other communication device and is determined based on reception signal quality. This transmission power control device includes: a quality determiner that determines whether the reception signal quality has become lower than a predetermined quality; and an autonomous controller that increases the transmission power in accordance with predetermined characteristics, regardless of the predetermined information supplied from the other communication device, when the quality determiner determines that the reception signal quality has become lower than the predetermined quality, the transmission power being increased from the transmission power value that is observed at the time of the determination.

To achieve the fourth object, the present invention provides a communication device that includes: a transmission power control information transmitter that performs radio transmission and reception with another communication device, and transmits transmission power control information that is determined based on reception signal quality and is to be used in a transmission power control operation in the other communication device; a controller that controls transmission power based on predetermined information supplied from the other communication device; and any of the transmission power control devices.

To achieve the fifth object, the present invention provides a transmission power control method of controlling transmission power of a mobile station in a mobile communication system in which transmission power control information to be used in a transmission power control operation at the mobile station is transmitted from a base station, and signal transmission and reception are performed between the base station and the mobile station to establish synchronization, before information data transmission is started between the base station and the mobile station. This transmission power control method includes the step of autonomously controlling transmission power to increase from an initial value in accordance with predetermined characteristics, regardless of the transmission power control information transmitted from the base station, after establishing synchronization at the mobile station with respect to a signal from the base station.

In this transmission power control method, when signal transmission and reception are performed between the base station and the mobile station to establish synchronization, the transmission power is increased from the initial value in accordance with the predetermined characteristics, regardless of the transmission power control information transmitted from the base station, before information data transmission is started between the mobile station and the base station.

Even if the transmission power control information transmitted from the base station represents a rapid increase of transmission power, the above predetermined characteristics are determined on the condition that synchronization is established in an early stage, regardless of the transmission power control information, and that a more efficient transmission power control operation is performed. Unless the transmission power becomes lower than the initial value, the predetermined characteristics can be arbitrarily set from the above point of view. For instance, the predetermined characteristics may represent a situation in which the transmission power is gradually increased, or a situation in which the transmission power is increased stepwise up to a certain value and then maintained at the certain value.

In the transmission power control method of the present invention, the autonomous control step may include the step of controlling transmission power to increase in accordance with gentler variation characteristics than variation characteristics of transmission power controlled based on the transmission power control information transmitted from the base station.

It is more preferable to switch transmission power control operations promptly at the time of stopping the transmission power control operation of the autonomous control step. Therefore, the transmission power control method of the present invention may further include the steps of: determining whether predetermined conditions for stopping the transmission power control operation of the autonomous control step are satisfied, after the transmission power control operation of the autonomous control step is started; and, when it is determined that the predetermined conditions are satisfied in the autonomous control stop condition determining step, switching transmission power control operations from the transmission power control operation of the autonomous control step to a transmission power control operation based on the transmission power control information transmitted from the base station.

By this transmission power control method, transmission power control operations are switched from the transmission power control operation of the autonomous control step to the transmission power control operation based on the transmission power control information transmitted from the base station, when the predetermined conditions are satisfied.

The predetermined conditions for stopping the transmission power control operation of the autonomous control step may be conditions that can be determined at the mobile station regardless of information transmitted from the base station, or conditions that can be determined at the mobile station based on information transmitted from the base station.

In the former case, the stop timing can be easily determined. Therefore, in the transmission power control method of the present invention, the autonomous control stop condition determining step may include the steps of: determining whether a predetermined period of time has passed since a start of the transmission power control operation of the autonomous control step; and determining that the predetermined conditions are satisfied when the predetermined period of time has passed since the start of the transmission power control operation of the autonomous control step.

In the latter case, the base station transmits predetermined transmission power control information until synchronization is established at the base station, and transmits closed-loop transmission power control information determined based on reception quality of a signal transmitted from the mobile station after synchronization is established at the base station based on the signal from the mobile station. In this case, the autonomous control stop condition determining step may include the step of determining whether the transmission power control information transmitted from the base station has been switched from the predetermined transmission power control information to the closed-loop transmission power control information. When it is determined in the control information switch determining step that the transmission power control information transmitted from the base station has been switched from the predetermined transmission power control information to the closed-loop transmission power control information, it is determined that the predetermined conditions are satisfied.

If the predetermined transmission power control information transmitted from the base station is not properly received at the mobile station, there is a possibility that the transmission power control information transmitted from the base station might be wrongly recognized as the closed-loop transmission power control information. To reduce this possibility, the autonomous control stop condition determining step may include the step of determining whether a predetermined period of time has passed since a start of the transmission power control operation of the autonomous control step. When it is determined in the start timing determining step that the predetermined period of time has passed since the start of the transmission power control operation of the autonomous control step, the control information switch determining step is carried out.

By this transmission power control method, the transmission power control information transmitted from the base station is not wrongly recognized as the closed-loop transmission power control information at least in the above predetermined period of time from a start of the transmission power control operation of the autonomous control step.

To achieve the fifth object, the present invention provides a transmission power control method of controlling transmission power of a mobile station in a mobile communication system in which transmission power control information to be used in a transmission power control operation at the mobile station is transmitted from a base station, and signal transmission and reception are performed between the base station and the mobile station to establish synchronization, before information data transmission is started between the base station and the mobile station. This transmission power control method includes the step of controlling transmission power based on gentle transmission power control information that is designed to increase the transmission power in accordance with gentler variation characteristics than variation characteristics of transmission power controlled based on the transmission power control information transmitted from the base station, after synchronization with a signal from the base station is established at the mobile station.

In this transmission power control method, a transmission power control operation based on the gentler transmission power control information generated based on the transmission power control information transmitted from the base station is performed at the mobile station, while signal transmission and reception are performed between the base station and the mobile station so as to establish synchronization, before information data transmission is started between the mobile station and the base station. Even if the transmission power control information transmitted from the base station represents a rapid increase of transmission power, the transmission power at the mobile station can be controlled with variation characteristics that are gentler than the variation characteristics represented by the transmission power control information transmitted from the base station.

The gentler transmission power control information is not limited to any particular form, as long as being generated based on the transmission power control information transmitted from the base station. For instance, the gentler transmission power control information may be generated based on information that is partially extracted from the transmission power control information transmitted from the base station, or may be generated based on the average information of information pieces obtained by dividing the transmission power control information transmitted from the base station.

It is more preferable to switch transmission power control operations promptly at the time of stopping the transmission power control operation of the gentle transmission power control step. Therefore, the transmission power control method of the present invention may further include the steps of: determining whether predetermined conditions for stopping the transmission power control operation of the gentle transmission power control step are satisfied, after the transmission power control operation of the gentle transmission power control step is started; and, when it is determined that the predetermined conditions are satisfied in the gentle transmission power control stop condition determining step, switching transmission power control operations from the transmission power control operation of the gentle transmission power control step to a transmission power control operation based on the transmission power control information transmitted from the base station.

To achieve the fifth object, the present invention further provides a transmission power control device that controls transmission power of a mobile station in a mobile communication system in which transmission power control information to be used in a transmission power control operation at the mobile station is transmitted from a base station, and signal transmission and reception are performed between the base station and the mobile station to establish synchronization, before information data transmission is started between the base station and the mobile station. This transmission power control device includes an autonomous controller that controls transmission power to increase from an initial value in accordance with predetermined characteristics, regardless of the transmission power control information transmitted from the base station, after synchronization with a signal from the base station is established at the mobile station.

To achieve the fifth object, the present invention also provides a transmission power control device that controls transmission power of a mobile station in a mobile communication system in which transmission power control information to be used in a transmission power control operation at the mobile station is transmitted from a base station, and signal transmission and reception are performed between the base station and the mobile station to establish synchronization, before information data transmission is started between the base station and the mobile station. This transmission power control device includes a gentle transmission power controller that controls transmission power based on gentle transmission power control information that is designed to control transmission power in accordance with gentler variation characteristics than variation characteristics of transmission power controlled based on the transmission power control information transmitted from the base station, after synchronization with a signal from the base station is established at the mobile station.

To achieve the sixth object, the present invention provides a mobile station that includes a transmission power control device that controls transmission power when signals are transmitted to and from a base station so as to establish synchronization before information data is sent to the base station that transmits transmission power control information to be used in a transmission power control operation. In this mobile station, the transmission power control device includes an autonomous controller that controls transmission power to increase from an initial value in accordance with predetermined characteristics, regardless of the transmission power control information transmitted from the base station, after synchronization with a signal from the base station is established at the mobile station.

To achieve the sixth object, the present invention further provides a mobile station that includes a transmission power control device that controls transmission power when signals are transmitted to and from a base station so as to establish synchronization before information data is sent to the base station that transmits transmission power control information to be used in a transmission power control operation. In this mobile station, the transmission power control device includes a gentle transmission power controller that controls transmission power based on gentle transmission power control information that is designed to control transmission power in accordance with gentler variation characteristics than variation characteristics of transmission power controlled based on the transmission power control information transmitted from the base station, after synchronization with a signal from the base station is established at the mobile station.

The other objects, features, and advantages of the present invention will become more apparent from the following description, with reference to the accompanying drawings.

BRIEF DESCRIPTION OF THE DRAWINGS

FIG. 5 illustrates an example of operation logic in the operation unit shown in FIG. 4;

PREFERRED EMBODIMENTS FOR CARRYING OUT THE INVENTION

The following is a description of embodiments of the present invention, with reference to the accompanying drawings.

Figure 1:
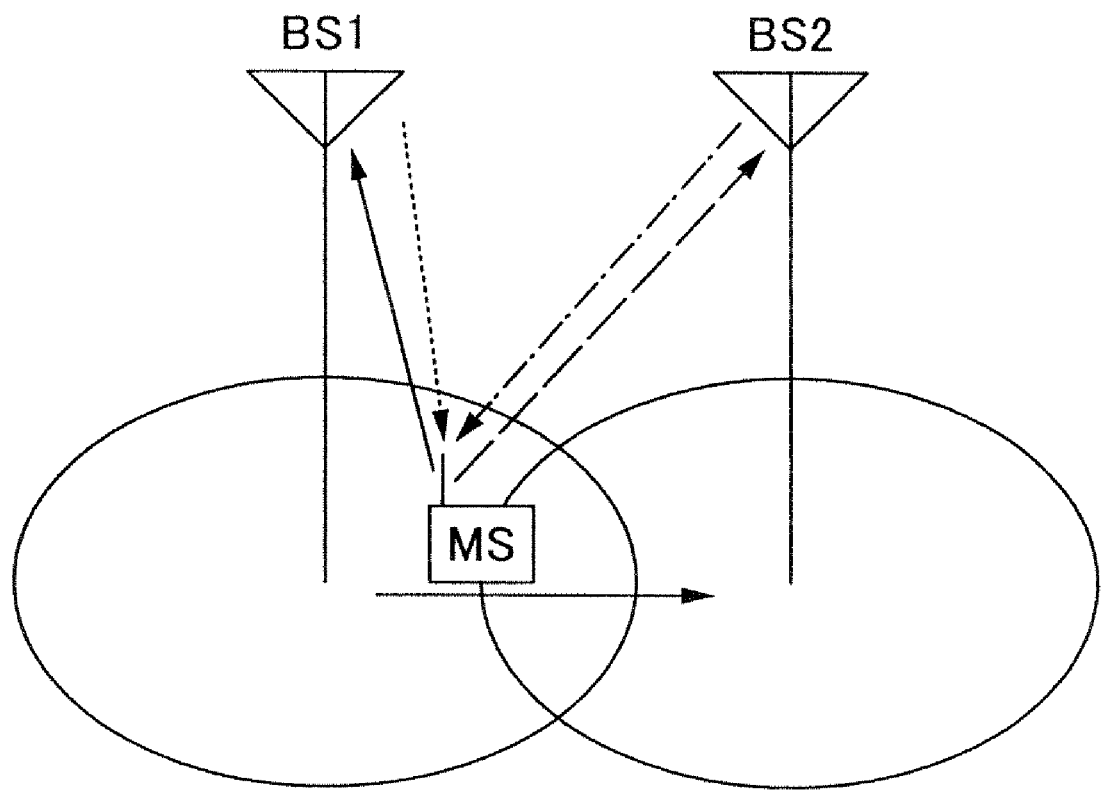
FIG. 1 illustrates a soft handover process in a mobile communication system to which a transmission power control method in accordance with the present invention is applied.

FIG. 1 illustrates a general example of soft handover in a CDMA mobile communication system to which a transmission power control method in accordance with an embodiment of the present invention is applied.

In the soft handover process shown in FIG. 1, a mobile station MS is radio-connected to base stations BS1 and BS2 in the boundary area between the service areas of the base stations BS1 and BS2, while moving from the service area of the base station BS1 to the service area of the base station BS2. In this situation, the mobile station MS combines signals received from the base stations BS1 and BS2, and obtains transmission information from the composite signal. The base stations BS1 and BS2 each receive signals transmitted from the mobile station MS. These received signals are combined by a host station, for example, and the transmission information of the mobile station MS is obtained from the composite signal.

With the mobile station MS being radio-connected to the base stations BS1 and BS2, the mobile station MS and the base stations BS1 and BS2 perform transmission power control based on transmission power control bits transmitted from communication terminals.

Figure 2:
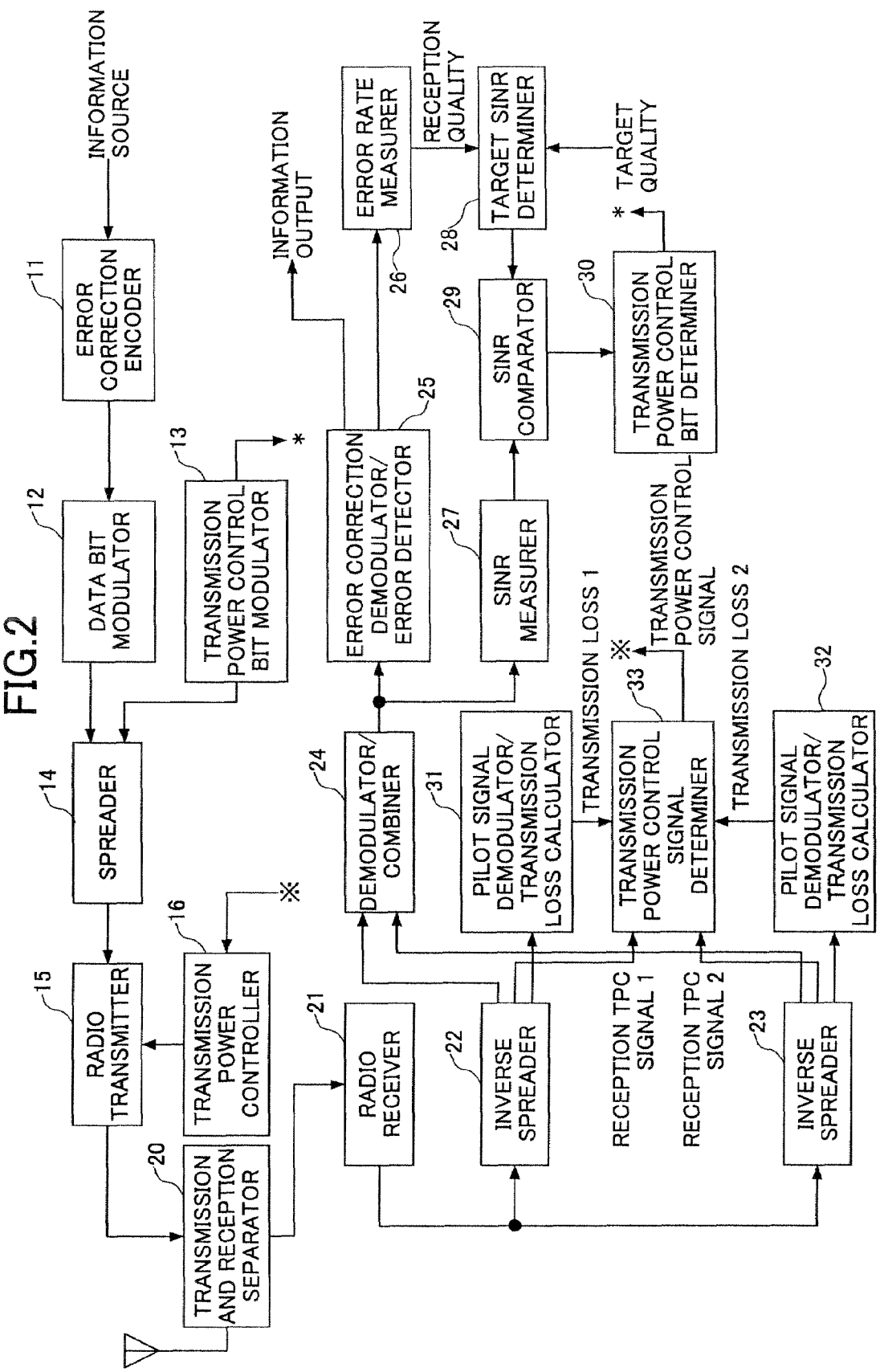
FIG. 2 is a block diagram illustrating an example structure of a mobile station on which transmission power control is performed by the transmission power control method that is an embodiment of the present invention.

The mobile station MS may have a structure shown in FIG. 2.

In FIG. 2, the mobile station MS includes a transmission and reception separator 20 and a transmission system that includes an error correction encoder 11, a data bit modulator 12, a transmission power control bit modulator 13, a spreader 14, a radio transmitter 15, and a transmission power controller 16.

Predetermined processes, such as adding an error detecting parity bit to each data frame, are carried out on data supplied from an information source (an audio processor or data processor) in accordance with the CRC (Cycle Redundancy Check) method, for example. The error correction encoder 11 encodes the data provided with a parity bit for each frame. The data bit modulator 12 generates a data modulation signal from the frame encoded data.

The transmission power control bit modulator 13 generates a control bit modulation signal from the transmission power control bits for controlling the base station transmission power generated in the manner described later. The control bit modulation signal indicates either "+1" corresponding to a transmission power control bit "1" (representing a power increase) or "−1" corresponding to a transmission power control bit "0" (representing a power decrease).

The spreader 14 multiplexes the data modulation signal generated from the date bit modulator 12 and the transmission power control bit modulation signal generated from the transmission power control bit modulator 13, and spreads the multiplexed signal using the characteristic spread code of the mobile station MS. The spread signal obtained by the spreader 14 is transmitted as a signal of a predetermined frequency from the radio transmitter 15 via the transmission and reception separator 20.

The transmission power controller 16 controls the transmission power of the radio transmitter 15 based on a transmission power control signal generated in the manner described later. The transmission power control signal can represent one of the control operations of increasing transmission power, decreasing transmission power, and maintaining transmission power. The transmission power controller 16 increases or decreases the transmission power of the radio transmitter 15 by a predetermined amount (dB), or maintains the current transmission power of the radio transmitter 15, in accordance with the control operation represented by the transmission power control signal.

The base stations BS1 and BS2 each have a transmission system having the same structure as the transmission system of the mobile station MS. Thus, the base stations BS1 and BS2 each multiplexes data and transmission power control bits for controlling transmission power in the mobile station MS, and transmits the multiplexed signal using a characteristic spread code.

The mobile station MS also has a reception system that includes a radio receiver 21, two inverse spreaders 22 and 23, a demodulator/combiner 24, an error correction decoder/error detector 25, an error rate measurer 26, a SINR measurer 27, a target SINR determiner 28, a SINR comparator 29, and a transmission power control bit determiner 30.

Once the spread signals generated by multiplexing the data and the transmission power control bits transmitted from the base stations BS1 and BS2 are received by the radio transmitter 21 in a soft handover process, the received signals are supplied to the inverse spreaders 22 and 23. The inverse spreader 22 spreads the received signal using the characteristic spread code of the base station BS1. By doing so, the inverse spreader 22 obtains a reception data signal and a reception transmission power control bit signal (hereinafter referred to as the "reception TPC signal 1") corresponding to the data and the transmission power control bit transmitted from the base station BS1. The inverse spreader 23 spreads the received signal using the characteristic spread code of the base station BS2. By doing so, the inverse spreader 23 obtains a reception data signal and a reception transmission power control bit signal (hereinafter referred to as the "reception TPC signal 2") corresponding to the data and the transmission power control bit transmitted from the base station BS2.

The demodulator/combiner 24 demodulates and combines the reception data signals obtained by the inverse spreaders 22 and 23, so as to generate a composite base band signal. The composite base band signal is then supplied to the error correction demodulator/error detector 25, which performs error correction decoding for each frame and determines whether there is a transmission error in accordance with the CRC method. The demodulation result is supplied as the information output to the signal processor (not shown) of the mobile station MS. The error correction demodulator/error detector 25 also outputs an error detection result that shows whether there is a transmission error for each frame.

The error rate measurer 26 calculates a frame error rate (FER) as the reception quality of the information restored from the reception signals (desired signal components), based on the error detection result from the error correction demodulator/error detector 25.

The SINR measurer 27 calculates a reception SINR (signal-to-interference plus noise power ratio). The target SINR determiner 28 determines such a target SINR that the reception quality (FER) of the information outputted from the error rate measurer 26 becomes equal to the target quality (outer loop control). The SINR comparator 29 compares the reception SINR transmitted from the SINR measurer 27 with the target SINR transmitted from the target SINR determiner 28, and outputs the comparison result.

The transmission power control bit determiner 30 determines the value of a transmission power control bit based on the comparison result from the SINR comparator 29 (inner loop control). More specifically, if the reception SINR is smaller than the target SINR, the transmission power control bit determiner 30 determines that the reception level of the deSINRed signal components is low, and determines the transmission power control bit to be "1", which represents a transmission power increase. On the other hand, if the reception SINR is equal to or greater than the target SINR, the transmission power control bit determiner 30 determines that the reception level of the desired signal components is high, and determines the transmission power control bit to be "0", which represents a transmission power decrease. The transmission power control bit determined in this manner is then supplied to the transmission power control bit modulator 13. Accordingly, the transmission power control bit is transmitted to the base stations BS1 and BS2, which then perform transmission power control based on the transmission power control bit.

Like the reception system of the mobile station MS, the base stations BS1 and BS2 each measures the reception SINR of each signal transmitted from mobile stations on which the same transmission power control as the above is to be performed, and determines such a transmission power control bit that the reception SINR becomes as close as possible to the target SINR.

Each of the base stations BS1 and BS2 also transmits a pilot signal of a constantly fixed power value through a pilot channel that is spread with a spread code that is different from the spread code used for the transmission of the data and the transmission power control bit. The pilot signal transmitted from each base station is used for determining to which base station the mobile station MS should be radio-connected in a soft handover process. Accordingly, the mobile station MS receives the pilot signal from each base station, and then determines to which base station it should be radio-connected, based on the transmission loss between the mobile station and the base station determined from the reception level and the reception SINR of the pilot signal or the reception level and the reception SINR of the pilot signal plus the transmission level of a pilot signal separately transmitted from the base station.

Here, the transmission level of a pilot signal is equal to the value set by notification information supplied to the mobile station MS. The notification information contains the transmission level of the pilot signal to be transmitted from the antenna of each base station. The value obtained by subtracting the reception level (dBm) measured in the mobile station MS from the transmission level (dBm) of the pilot signal represents a transmission loss (dB). The reception level to be used for determining a transmission loss value should be subjected to an averaging process so as to avoid influence of an instantaneous variation (a fading variation) in the electric wave transmission path. As a result, the reception level can more accurately represent a distance variation.

The mobile station MS further includes two pilot signal demodulators/transmission loss calculators 31 and 32, and a transmission power control signal determiner 33 in the reception system. The pilot signal demodulators/transmission loss calculators 31 and 32 each calculate a transmission loss to be used for determining to which base station the mobile station MS should be radio-connected. More specific procedures will be as follows.

After the pilot signal transmitted through the pilot channel of one of the base stations BS1 and BS2, whichever is determined to be a base station to which the mobile station MS should be radio-connected, is received by the radio receiver 21 via the transmission and reception separator 20 in a soft handover process, the received signal is then supplied to the inverse spreaders 22 and 23. The inverse spreader 22 performs an inverse spread process on the received signal, using the spread code of the pilot channel of the base station BS1. Through this inverse spread process, a reception pilot signal corresponding to the pilot signal transmitted from the base station BS1 can be obtained. Meanwhile, the inverse spreader 23 performs an inverse spread process on the received signal, using the spread code of the pilot channel of the base station BS2. Through this inverse spread process, a reception pilot signal corresponding to the pilot signal transmitted from the base station BS2 can be obtained.

The reception pilot signal obtained by the inverse spreader 22 is supplied to the pilot signal demodulator/transmission loss calculator 31. The pilot signal demodulator/transmission loss calculator 31 demodulates the supplied reception pilot signal, and calculates the reception level (dBm) of the pilot signal from the demodulated signal. Using the reception level (dBm) and the transmission level (dBm) of the pilot signal supplied as the notification information from the network side as described above, a transmission loss 1 in the electric wave transmission path between the mobile station MS and the base station BS1 is calculated. More specifically, the difference between the transmission level (dBm) of the pilot signal and the reception level (dBm) of the pilot signal is obtained as the transmission loss 1 (dB).

The reception pilot signal obtained by the inverse spreader 23 is supplied to the pilot signal demodulator/transmission loss calculator 32. The pilot signal demodulator/transmission loss calculator 32 demodulates the supplied reception pilot signal, and calculates the reception level (dBm) of the pilot signal from the demodulated signal. Like the pilot signal demodulator/transmission loss calculator 31, the pilot signal demodulator/transmission loss calculator 32 calculates the difference between the transmission level (dBm) of the pilot signal and the reception level (dBm) of the pilot signal transmitted as the notification information, and sets the difference as a transmission loss 2 (dB) in the electric wave transmission path between the mobile station MS and the base station BS2.

The reception TPC signal 1 that is obtained by the inverse spreader 22 and corresponds to the transmission power control bit transmitted from the base station BS1, the reception TPC signal 2 that is obtained by the inverse spreader 23 and corresponds to the transmission power control bit transmitted from the base station BS2, the transmission loss 1 in the electric wave transmission path between the mobile station MS and the base station BS1 that is obtained by the pilot signal demodulator/transmission loss calculator 31, and the transmission loss 2 in the electric wave transmission path between the mobile station MS and the base station BS2 that is obtained by the pilot signal demodulator/transmission loss calculator 32, are supplied to the transmission power control signal determiner 33.

The transmission power control signal determiner 33 determines a transmission power control signal for the mobile station MS, based on the information of two transmission power control bits transmitted from the base stations BS1 and BS2 radio-connected to the mobile station MS. In other words, the transmission power control signal determiner 33 determines the transmission power control signal based on the reception TPC signal 1, the reception TPC signal 2, the transmission loss 1, and the transmission loss 2. In determining the transmission power control signal, the transmission power control signal determiner 33 regards the transmission loss 1 and the transmission loss 2 as the reliabilities of the reception TPC signal 1 and the reception TPC signal 2.

Figure 3:
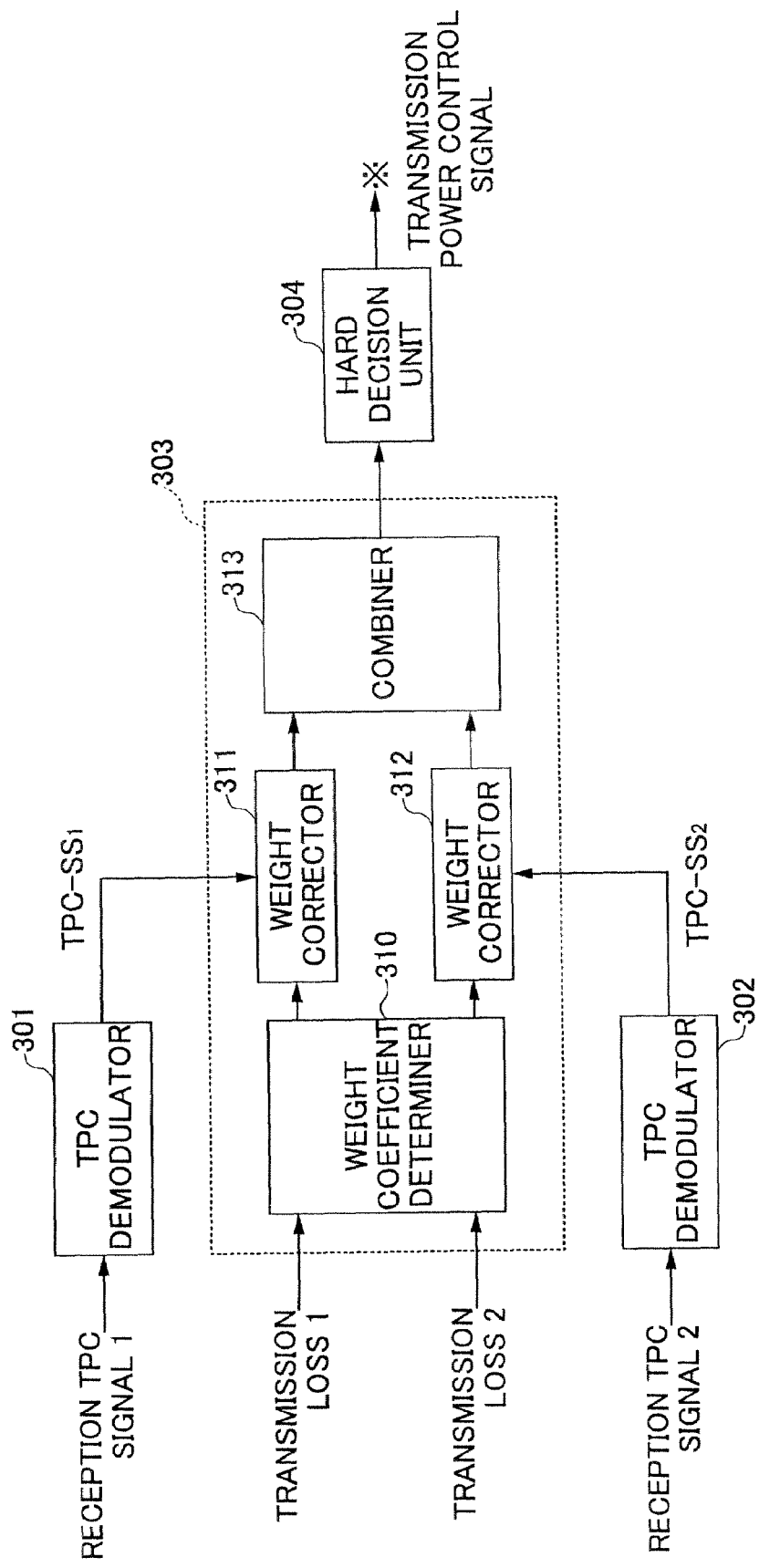
FIG. 3 is a block diagram illustrating a first example structure of the transmission power control signal determiner of the mobile station shown in FIG. 2.

Referring now to FIG. 3, a first example structure of the transmission power control signal determiner 33 will be described.

In FIG. 3, the transmission power control signal determiner 33 includes two TPC demodulators 301 and 302, a TPC soft decision value weight combiner 303, and a hard decision unit 304. The TPC soft decision value weight combiner 303 includes a weight coefficient determiner 310, two weight correctors 311 and 312, and a combiner 313.

The TPC demodulator 301 demodulates the reception TPC signal 1 supplied from the inverse spreader 22, and outputs the level value of the demodulated signal as a soft decision value TPC-SS1 of the transmission power control bit supplied from the base station BS1. The TPC demodulator 302 demodulates the reception TPC signal 2 supplied from the inverse spreader 23, and outputs the level value of the demodulated signal as a soft decision value TPC-SS2 of the transmission power control bit transmitted from the base station BS2. These soft decision values TPC-SS1 and TPC-SS2 reflect the conditions of the electric wave transmission paths between the mobile station MS and the base stations BS1 and BS2, respectively. For instance, if the transmission power control bits are demodulated to the values "+1" and "−1" and then transmitted, the soft decision values TPC-SS1 and TPC-SS2 should be "+1" and "−1" in the transmission paths in the ideal conditions.

The weight coefficient determiner 310 of the TPC soft decision value weight combiner 303 determines weight coefficients for the soft decision values TPC-SS1 and TPC-SS2, based on the transmission loss 1 and the transmission loss 2. The weight coefficient determiner 310 determines each weight coefficient in such a manner that, the smaller the transmission loss, the greater the weight coefficient. For instance, the weight coefficients are determined based on the reciprocals of the transmission losses 1 and 2.

The weight corrector 311 multiplies the soft decision value TPC-SS1 of the transmission power control bit by the weight coefficient corresponding to the transmission loss 1, so as to output a corrected value. The weight corrector 312 multiplies the soft decision value TPC-SS2 of the transmission power control bit by the weight coefficient corresponding to the transmission loss 2, so as to output a corrected value. In this manner, the transmission losses 1 and 2 are considered as the reliabilities of the soft decision values TPC-SS1 and TPC-SS2 of the transmission power control bits. In other words, a soft decision value TPC-SS1 or TPC-SS2 that is believed to have a high reliability is multiplied by a great weight coefficient.

The combiner 313 performs maximum ratio combining (MRC) on the corrected values of the soft decision values TPC-SS1 and TPC-SS2 outputted from the weight correctors 311 and 312. More specifically, the corrected values are added up, and a TPC combined soft decision value is outputted from the combiner 313.

In a case where the soft decision value TPC-SS1 of the transmission power control bit (0, 0, 0, 0, 0, . . . ) transmitted from the base station BS1 is "−0.2, −0.3, 0.1, −0.3, −0.6, . . . ", the soft decision value TPC-SS2 of the transmission power control bit (1, 1, 1, 1, 1, . . . ) transmitted from the base station BS2 is "0.6, 0.3, 0.4, 0.2, −0.1 . . . ", and the weight coefficient corresponding to the transmission loss 1 is 1.1, while the weight coefficient corresponding to the transmission loss 2 is 0.9, the TPC combined soft decision value becomes "0.32, −0.06, 0.47, −0.15, −0.75 . . . ".

The TPC combined soft decision value obtained in the above manner is then supplied to the hard decision unit 304. The hard decision unit 304 determines whether the supplied TPC combined soft decision value is equal to or greater than a predetermined threshold value, or smaller than the predetermined threshold value, and outputs the determination result as a transmission power control signal. If the predetermines threshold value is "0" and the TPC combined soft decision value is "0.32, −0.06, 0.47, −0.15, −0.75, . . . ", a transmission power control signal "1, 0, 1, 0, 0, . . . " is outputted.

Based on the transmission power control signal, the transmission power controller 16 increases the transmission power at the radio transmitter 15 by a predetermined amount (the transmission power control signal=1) or decreases the transmission power at the radio transmitter 15 by a predetermined amount (the transmission power control signal=0).

As described above, in the mobile station MS, weight combining is performed on the soft decision values TPC-SS1 and TPC-SS2 of the transmission power control bits transmitted from the base stations BS1 and BS2, so that the transmission loss in the transmission path between the mobile station MS and each of the base stations BS1 and BS2 determined from the transmission level and the reception level of a pilot signal subjected to no transmission power control (i.e., transmitted with a fixed transmission power) can be regarded as being reliable. The hard decision result of a TPC combined soft decision value obtained by the weight combining is set as a transmission power control signal. Based on the transmission power control signal, the transmission power control is performed in the mobile station MS. Thus, the conditions of the transmission path between the mobile station MS and each of the base stations BS1 and BS2 can be more accurately taken into consideration in the transmission power control for the mobile station MS.

In the above example, the threshold value in the hard decision unit 304 is set at "0", which is the center value between the modulated signals "+1" and "−1" of the transmission power control bits transmitted from the base stations BS1 and BS2. To realize efficient transmission power control, the threshold value may be set slightly closer to "+1". In such a case, the TPC weight combined value may easily be determined to be "0" which represents a transmission power decrease, and the transmission power control can be performed with a relatively low power. The threshold value in the hard decision unit 304 can be arbitrarily set within such a range that communication between each mobile station and each base station can be properly established any time in the mobile communication system.

Figure 4:
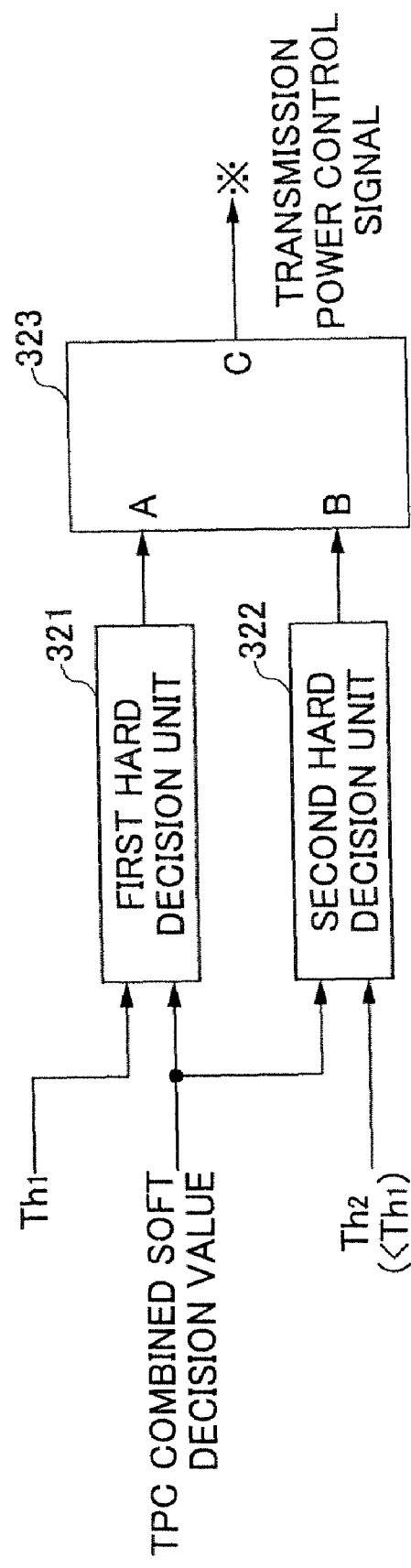
FIG. 4 is a block diagram illustrating an example structure of a hard decision unit.

The hard decision unit 304 may have a structure shown in FIG. 4. This hard decision unit 304 uses two threshold values Th1 and Th2.

In FIG. 4, the hard decision unit 304 includes a first hard decision unit 321, a second hard decision unit 322, and an operation unit 323. The first hard decision unit 321 performs a hard decision on the TPC combined soft decision value supplied from the TPC soft decision value weight combiner 303, using the first threshold value Th1. More specifically, the first hard decision unit 321 determines whether the TPC combined soft decision value is equal to or greater than the first threshold value Th1, or smaller than the first threshold value Th1. The first hard decision unit 321 then outputs the decision result. Meanwhile, the second hard decision unit 322 performs a hard decision on the TPC combined soft decision value, using the second threshold value Th2, which is smaller than the first threshold value Th1 (Th2<Th1). More specifically, the second hard decision unit 322 determines whether the TPC combined soft decision value is equal to or greater than the second threshold value Th2, or smaller than the second threshold value Th2. The second hard decision unit 322 then outputs the decision result.

Figure 5:
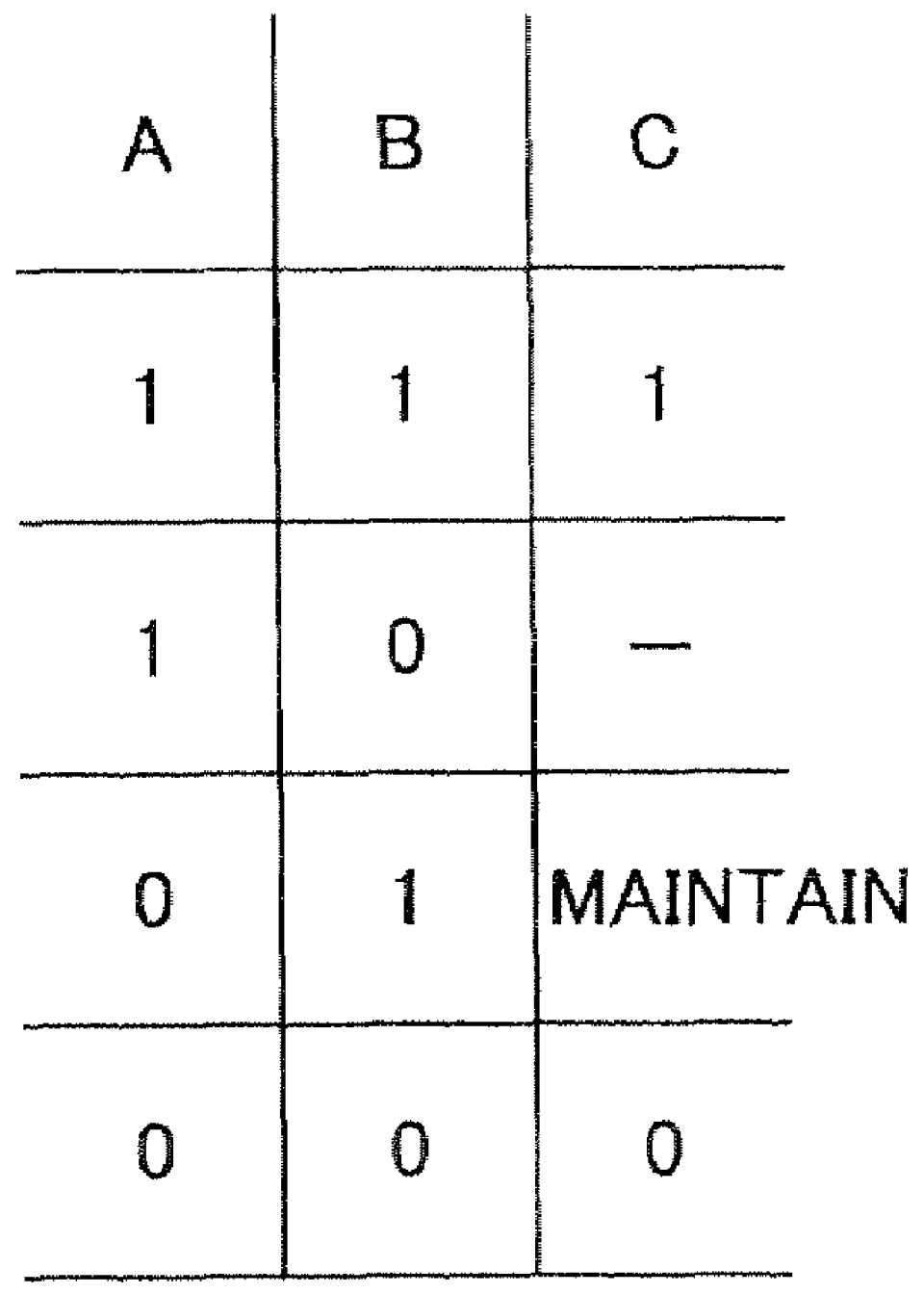

The operation unit 323 outputs an operation result C obtained from a decision value A supplied from the first hard decision unit 321 and a decision value B supplied from the second hard decision unit 322. The operation result C is outputted as a transmission power control signal. The operation logic may be as shown in FIG. 5. More specifically, if the decision value A is "1" (which indicates that the TPC combined soft decision value is equal to or greater than the first threshold value Th1) while the decision value B is "1" (which indicates that the TPC combined soft decision value is equal to or greater than the second threshold value Th2), an operation result C of "1" is outputted as a transmission power control signal that represents a transmission power increase by a predetermined amount (dB). If the decision value A is "0" (which indicates that the TPC combined soft decision value is smaller than the first threshold value Th1) while the decision value B is "0" (which indicates that the TPC combined soft decision value is smaller than the second threshold value Th2), an operation result C of "0" is outputted as a transmission power control signal that represents a transmission power decrease by a predetermined amount (dB).

Further, if the decision value A is "0" while the decision value B is "1", i.e., if the TPC combined soft decision value is smaller than the first threshold value Th1 but equal to or greater than the second threshold value Th2, an operation result C of "Maintain" is outputted as a transmission power control signal to maintain the current transmission power. A situation in which the decision value A is "1" while the decision value B is "0" is not logically possible, because the first threshold value Th1 is greater than the second threshold value Th2 (Th1>Th2).

With the above structure of the hard decision unit 304, the current transmission power is maintained when the TPC combined soft decision value does not clearly represent a power increase or a power decrease (i.e., when the TPC combined soft decision value is smaller than the first threshold value Th1 but equal to or greater than the second threshold value Th2). Thus, an inadvertent increase or decrease of transmission power can be prevented.

Figure 6:
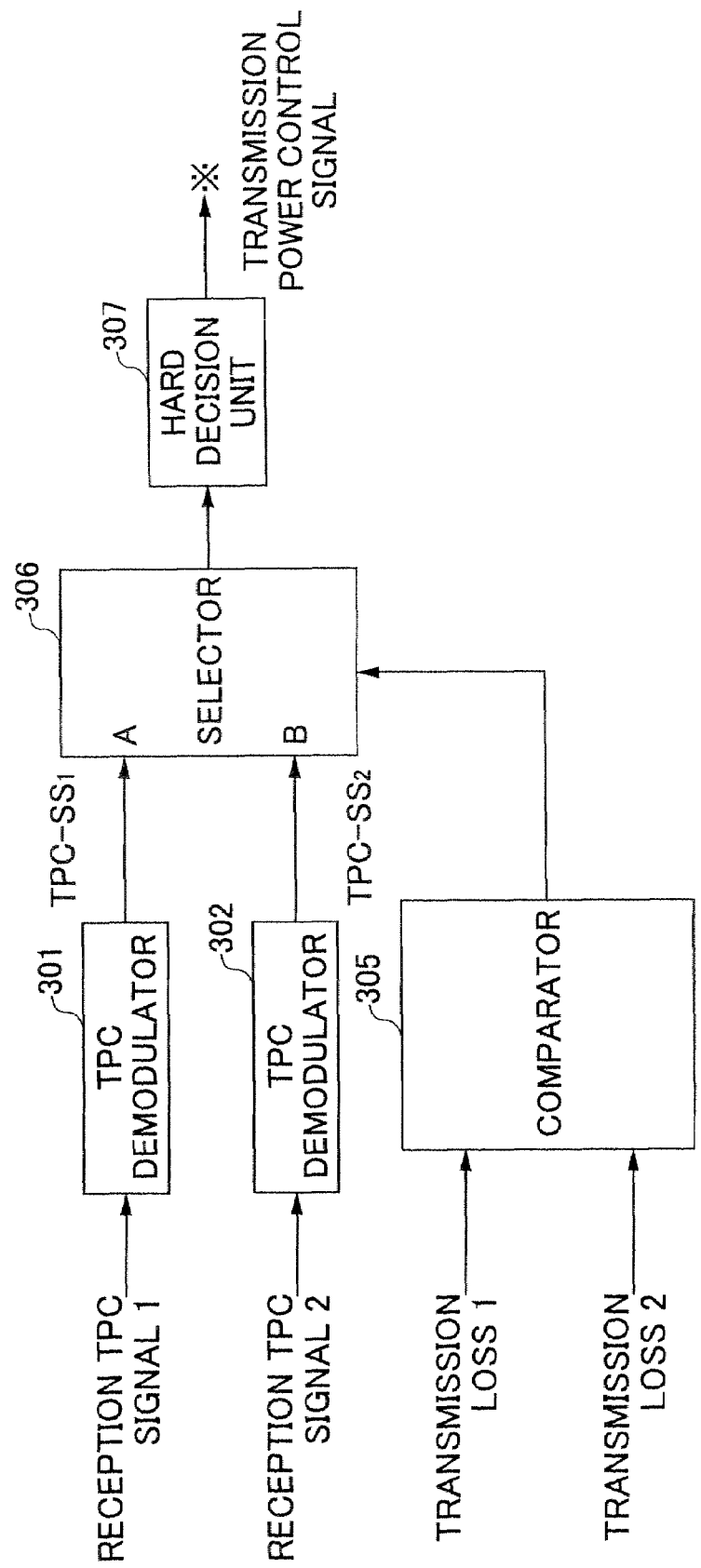
FIG. 6 is a block diagram illustrating a second example structure of the transmission power control signal determiner of the mobile station shown in FIG. 2.

Referring now to FIG. 6, a second example structure of the transmission power control signal determiner 33 will be described. In FIG. 6, the same components as those in FIG. 3 are denoted by the same reference numerals also as those in FIG. 3.

As can be seen from FIG. 6, the transmission power control signal determiner 33 includes two TPC demodulators 301 and 302, a comparator 305, a selector 306, and a hard decision unit 307. Like the foregoing example (see FIG. 3), the TPC demodulators 301 and 302 demodulate the reception TPC signal 1 and the reception TPC signal 2 supplied from the inverse spreaders 22 and 23, and output the level values of the demodulated signals as the soft decision values TPC-SS1 and TPC-SS2 of the transmission power control bits transmitted from the base stations BS1 and BS2.

The comparator 305 compares the transmission loss 1 calculated by the pilot signal demodulator/transmission loss calculator 31 with the transmission loss 2 calculated by the pilot signal demodulator/transmission loss calculator 32, and outputs the comparison result. The selector 306 inputs the comparison result from the comparator 305 as a selection control signal, and, based on the selection control signal, selects either the output from the TPC demodulator 301, which is the soft decision value TPC-SS1 of the transmission power control bit transmitted from the base station BS1, or the output from the TPC demodulator 302, which is the soft decision value TPC-SS2 of the transmission power control bit transmitted from the base station BS2.

If a selection control signal based on a comparison result indicating that the transmission loss 1 is smaller than the transmission loss 2 is inputted into the selector 306 from the comparator 305, the selector 306 selects the output from the TPC demodulator 301. If a selection control signal based on a comparison result indicating that the transmission loss 2 is smaller than the transmission loss 1 is inputted into the selector 306 from the comparator 305, the selector 306 selects the output from the TPC demodulator 302.

The hard decision unit 307 performs a hard decision on the selected soft decision value TPC-SS1 or TPC-SS2 of the transmission power control bit, using a predetermined threshold value. The hard decision unit 307 then outputs the hard decision result as a transmission power control signal. It should be noted that the hard decision unit 307 can perform a hard decision on the soft decision value TPC-SS1 or TPC-SS2 in the same manner as that of the hard decision unit 304 (see FIG. 3).

With the transmission power control signal determiner 33 having the above structure, a transmission power control signal is determined based on the soft decision value TPC-SS1 or TPC-SS2 of the transmission power control bit transmitted through the electric wave transmission path having the smallest transmission loss among the electric wave transmission paths between the mobile station MS and the base stations BS1 and BS2. Accordingly, transmission power control can be performed for the mobile station MS, while the conditions of the transmission path between the mobile station MS and each of the base stations BS1 and BS2 is taken into consideration.

The transmission power control for the mobile station MS based on a transmission power control signal determined by the transmission power control signal determiner 33 having the above structure (shown in FIG. 6) is preferable in that more accurate transmission power control can be performed when there is a great difference between the transmission losses in the transmission paths between the mobile station MS and the base stations.

Figure 7:
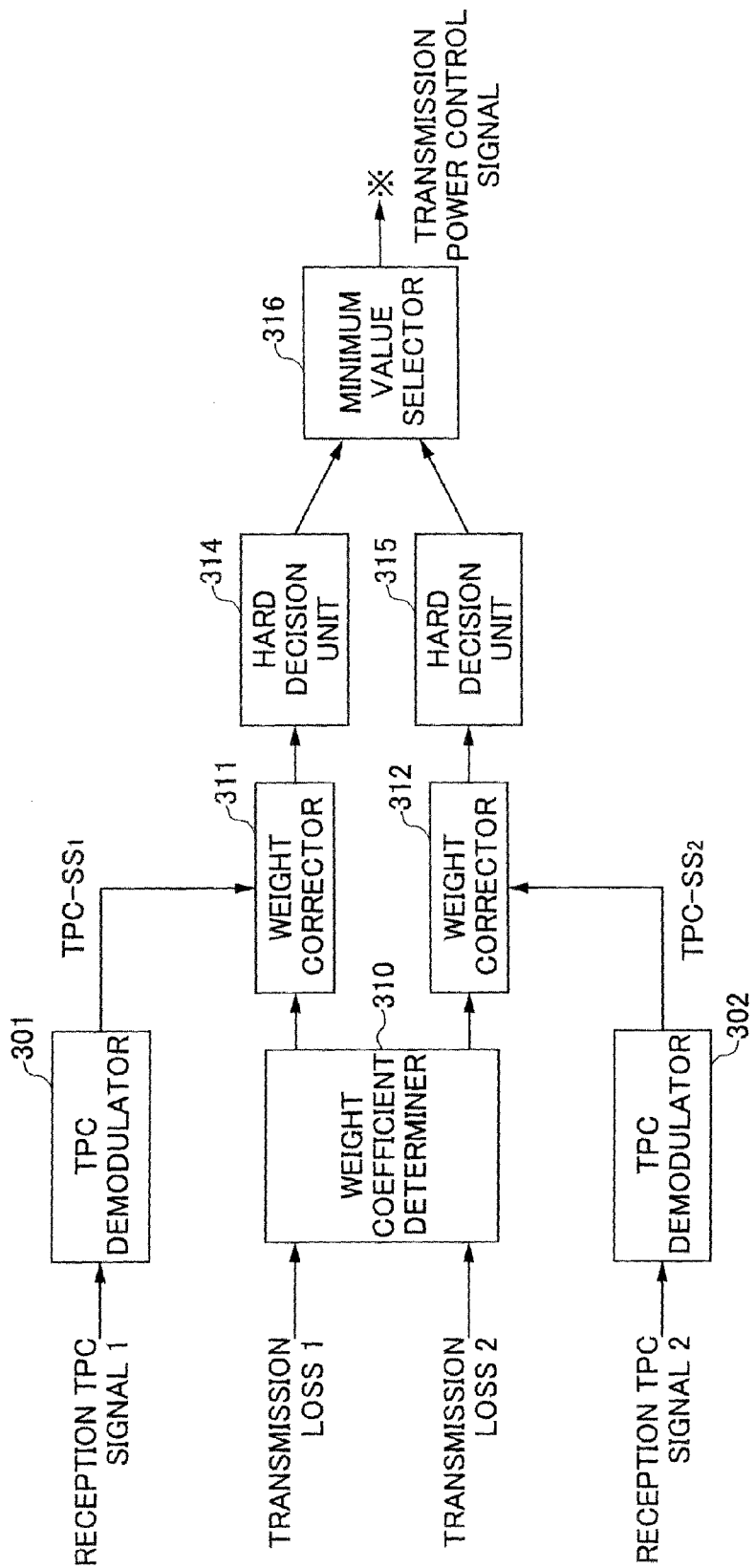
FIG. 7 is a block diagram illustrating a third example structure of the transmission power control signal determiner of the mobile station shown in FIG. 2.

Referring now to FIG. 7, a third example structure of the transmission power control signal determiner 33 will be described. In FIG. 7, the same components as those in FIG. 3 are denoted by the same reference numerals also as those in FIG. 3.

As can be seen from FIG. 7, the transmission power control signal determiner 33 includes two TPC demodulators 301 and 302, a weight coefficient determiner 310, two weight correctors 311 and 312, two hard decision units 314 and 315, and a minimum value selector 316.

Like the first example structure (see FIG. 3), the weight coefficient determiner 310 determines weight coefficients corresponding to the transmission loss 1 and the transmission loss 2, and weight correctors 311 and 312 multiply the outputs of the TPC demodulators 301 and 302, which are the soft decision values TPC-SS1 and TPC-SS2 of the transmission power control bits transmitted from the base stations BS1 and BS2, by the weight coefficients corresponding to the transmission loss 1 and the transmission loss 2, so as to output corrected values.

The hard decision unit 314 performs a hard decision on the corrected value of the soft decision value TPC-SS1 outputted from the weight corrector 311, using a predetermined threshold value. The hard decision unit 315 also performs a hard decision on the corrected value of the soft decision value TPC-SS2 outputted from the weight corrector 312, using a predetermined threshold value. The hard decision output from the hard decision unit 314 corresponds to the transmission power control bit transmitted from the base station BS1, while the hard decision output from the hard decision unit 315 corresponds to the transmission power control bit transmitted from the base station BS2.

If the values of both hard decision outputs of the hard decision units 314 and 315 are the same (both indicating "1" that represents a transmission power increase or both indicating "0" that represents a transmission power decrease), the minimum value selector 316 outputs the value of either one of the hard decision outputs as a transmission power control signal. If the values of the hard decision outputs from the hard decision units 314 and 315 are different from each other (one of the values indicating "1" that represents a transmission power increase, while the other indicating "0" that represents a transmission power decrease), the minimum value selector 316 outputs the smaller value "0" as a transmission power control signal.

In a case where the value of the hard decision output from the hard decision unit 314 is "1, 0, 1, 0, 0, . . . " while the value of the hard decision output from the hard decision unit 315 is "1, 1, 1, 1, 1, . . . ", the minimum value selector 316 outputs "1, 0, 1, 0, 0, . . . " as a transmission power control signal.

With the transmission power control signal determiner 33 having the above structure, the transmission losses in the transmission paths between the mobile station MS and the base stations BS1 and BS2 are regarded as representing reliabilities, and weight correction is performed on the soft decision values TPC-SS1 and TPC-SS2 of the transmission power control bits transmitted from the base stations BS1 and BS2. If the hard decision results of the weight-corrected values are different from each other, the smaller hard decision result is set as a transmission power control signal. Based on the transmission power control signal determined in this manner, transmission power control for the mobile station MS is performed. Accordingly, the conditions of the transmission paths between the mobile station MS and the base stations BS1 and BS2 can be more accurately taken into consideration, and efficient transmission power control for the mobile station MS can be performed.

Figure 8:
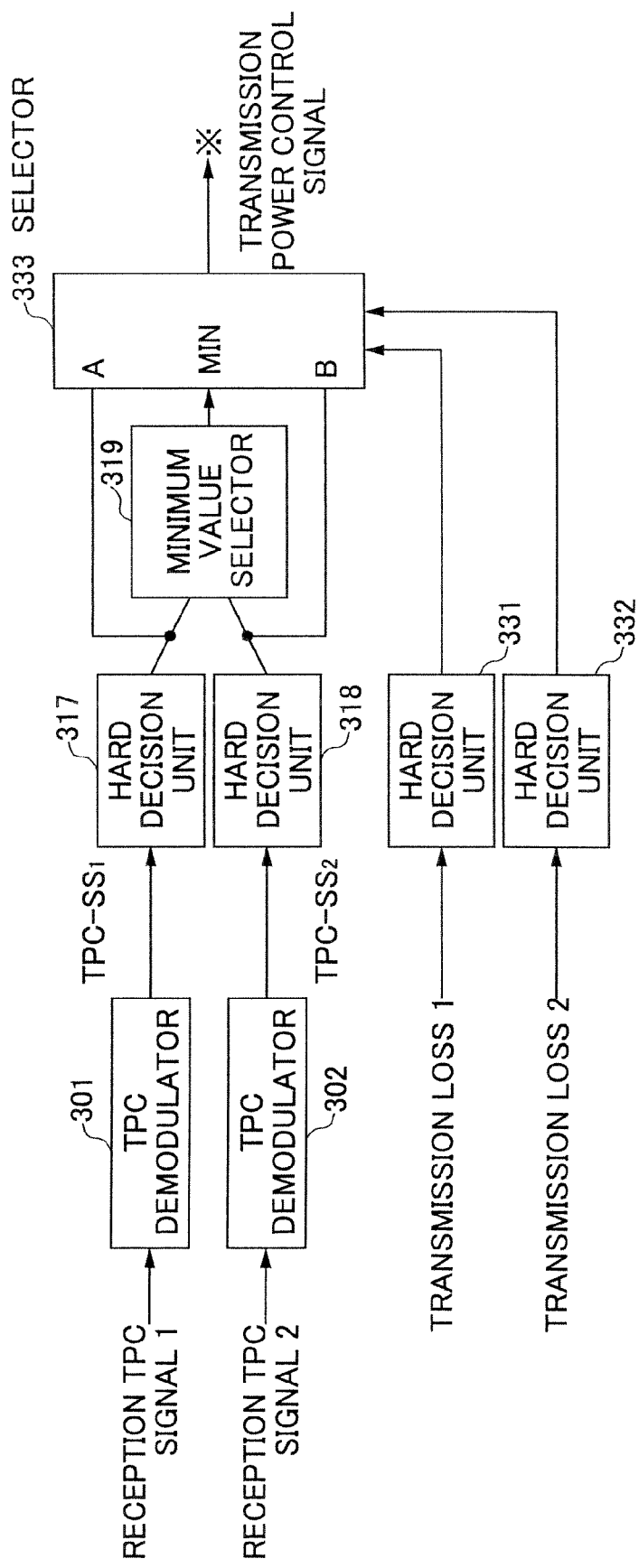
FIG. 8 is a block diagram illustrating a fourth example structure of the transmission power control signal determiner of the mobile station shown in FIG. 2.

Referring now to FIG. 8, a fourth example structure of the transmission power control signal determiner 33 will be described. In FIG. 8, the same components as those in FIG. 3 are denoted by the same reference numerals also as those in FIG. 3.

As can be seen from FIG. 8, the transmission power control signal determiner 33 includes two TPC demodulators 301 and 302, four hard decision units 317, 318, 331, and 332, a minimum value selector 319, and a selector 333. Like each of the foregoing examples, the TPC demodulators 301 and 302 demodulate the reception TPC signal 1 and the reception TPC signal 2 supplied from the inverse spreaders 22 and 23 (see FIG. 2), and output the level values of the modulated signals as the soft decision values TPC-SS1 and TPC-SS2 of the transmission power control bits transmitted from the base stations BS1 and BS2.

The hard decision unit 317 performs a hard decision on the soft decision value TPC-SS1 outputted from the TPC demodulator 301, using a predetermined threshold value. The hard decision output from the hard decision unit 317 corresponds to the transmission power control bit transmitted from the base station BS1. The hard decision unit 318 performs a hard decision on the soft decision value TPC-SS2 outputted from the TPC demodulator 302, using a predetermined threshold value. The hard decision output from the hard decision unit 318 corresponds to the transmission power control bit transmitted from the base station BS2.

If the values of both hard decision outputs from the hard decision units 317 and 318 are the same, the minimum value selector 319 outputs the value of either one of the hard decision outputs. If the values of the hard decision outputs from the hard decision units 317 and 318 are different from each other ("0" and "1"), the minimum value selector 319 outputs the smaller value "0" as a transmission power control signal.

The hard decision unit 331 outputs either a hard decision result indicating that the transmission loss 1 calculated by the pilot signal demodulator/transmission loss calculator 31 is equal to or greater than a predetermined threshold value, or a hard decision result indicating that the transmission loss 1 is smaller than the predetermined threshold. The hard decision unit 332 outputs a hard decision result indicating that the transmission loss 2 calculated by the pilot signal demodulator/transmission loss calculator 32 is equal to or greater than the predetermined threshold value, or a hard decision result indicating that the transmission loss 2 is smaller than the predetermined threshold value. The hard decision results from the hard decision units 331 and 332 are supplied as selection control signals to the selector 333.

Based on the selection control signals, the selector 333 selects a hard decision output value A of the hard decision unit 317 corresponding to the transmission power control bit transmitted from the base station BS1, an output value MIN from the minimum value selector 319, or a hard decision output value B of the hard decision unit 318 corresponding to the transmission power control bit transmitted from the base station BS2.

For instance, if the transmission loss 1 is smaller than the predetermined threshold value while the transmission loss 2 is equal to or greater than the predetermined threshold value, the selector 333 selects the hard decision output value A of the hard decision unit 317 and outputs the hard decision output value A as a transmission power control signal, in accordance with the selection control signals based on the hard decision results outputted from the hard decision units 331 and 332. If the transmission loss 1 is equal to or greater than the predetermined threshold value while the transmission loss 2 is smaller than the threshold value, the selector 333 selects the hard decision output value B of the hard decision unit 318 and outputs the hard decision output value B as a transmission power control signal, in accordance with the selection control signals based on the hard decision results outputted from the hard decision units 331 and 332. Further, if the transmission loss 1 and the transmission loss 2 are both smaller than the predetermines threshold value, the selector 333 selects the output value MIN from the minimum value selector 319 and outputs the output value MIN as a transmission power control signal, in accordance with the selection control signals based on the hard decision results outputted from the hard decision units 331 and 332.

With the transmission power control signal determiner 33 having the above structure, a transmission power control signal is determined by the hard decision result of the soft decision value of the transmission power control bit transmitted through the electric wave transmission path having the smaller transmission loss of the electric wave transmission paths between the mobile station MS and the base stations BS1 and BS2. Also, if the transmission losses in the electric wave transmission paths between the mobile station MS and the base stations BS1 and BS2 are both equal to or greater than the predetermined threshold value, or both smaller than the predetermined threshold value, the soft decision values TPC-SS1 and TPC-SS2 of the transmission power control bits transmitted from the base stations BS1 and BS2 are considered to have the same reliabilities (or only the same reliabilities), and the smaller value ("0") of the hard decision results is set as a transmission power control signal.

Figure 9:
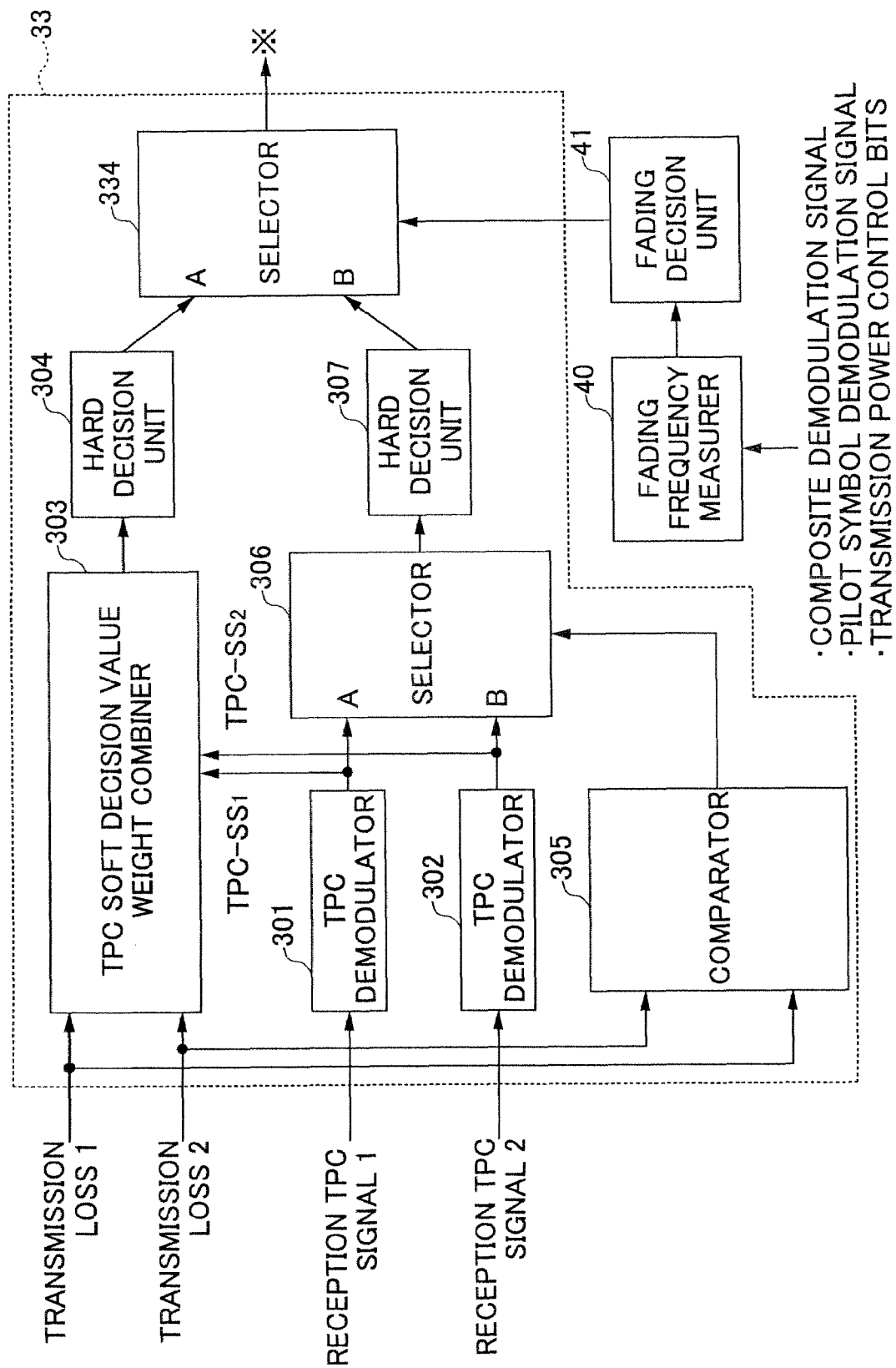
FIG. 9 is a block diagram illustrating a fifth example structure of the transmission power control signal determiner of the mobile station shown in FIG. 2.

Referring now to FIG. 9, a fifth example structure of the transmission power control signal determiner 33 will be described. In FIG. 9, the same components as those shown in FIGS. 3 and 6 are denoted by the same reference numerals also as those shown in FIGS. 3 and 6.

As can be seen from FIG. 9, the transmission power control signal determiner 33 includes two TPC demodulators 301 and 302, a TPC soft decision value weight combiner 303, and a hard decision unit 304, which are the same as the components of the example structure shown in FIG. 3. The transmission power control signal determiner 33 also includes a selector 306 that selects one of the soft decision values TPC-SS1 and TPC-SS2 supplied from the TPC demodulators 301 and 302, a comparator 305 that compares the transmission loss 1 with the transmission loss 2 and outputs the comparison result as a selection control signal to the selector 306, and a hard decision unit 307, which are the same as the components of the example structure shown in FIG. 6. The transmission power control signal determiner 33 further includes a selector 334 that selects either the hard decision output value from the hard decision unit 304 or the hard decision output value from the hard decision unit 307.

The mobile station MS in this example further includes a fading frequency measurer 40 and a fading decision unit 41. The fading frequency measurer 40 measures the fading frequency of each reception signal. The fading frequency may be measured based on the level variation of an output signal (a composite demodulation signal) supplied from the demodulator/combiner 24. The fading frequency of each spread channel may also be determined based on the level variation of a demodulation signal of a pilot signal in each spread channel (see Japanese Laid-Open Patent Application No. 2000-082929, already filed by the present applicant). The average value of the fading frequency of each spread channel and the largest fading frequency among the fading frequencies of the spread channels can be used as fading frequency measurement values. If the level of the desired signal components decreases due to fading, the reception SINR drops, and a transmission power control bit is determined so as to bring the reception SINR closer to the target SINR. Accordingly, the fading frequency can be measured based on the variation of the transmission power control bit determined in the above manner.

The fading decision unit 41 determines whether the fading frequency measured by the fading frequency measurer 40 in the above manner is not smaller than a reference value, and outputs the decision result as a selection control signal. Receiving a selection control signal corresponding to a decision result from the fading decision unit 41 indicating that the measured value of the fading frequency is smaller than the reference value, the selector 334 selects the hard decision output value from the hard decision unit 304, and outputs the hard decision output value as a transmission power control signal. Receiving a selection control signal corresponding to a decision result from the fading decision unit 41 indicating that the measured value of the fading frequency is equal to or greater than the reference value, the selector 334 selects the hard decision output value from the hard decision unit 307, and outputs the hard decision output value as a transmission power control signal.

With the transmission power control signal determiner 33 having the above structure, if the moving speed of the mobile station MS and the fading frequency at the mobile station MS are both relatively low, weight combining is performed on the soft decision values TPC-SS1 and TPC-SS2 of the transmission power control bits transmitted from the base stations BS1 and BS2, based on the transmission losses 1 and 2 in the electric wave transmission paths between the mobile station MS and the base stations BS1 and BS2, and a hard decision result of a TPC combined soft decision value obtained from the weight combining is set as a transmission power control signal. This process is the same as in the example shown in FIG. 3. On the other hand, if the moving speed of the mobile station MS and the fading frequency at the mobile station MS are relatively high, a transmission power control signal is determined based on a soft decision value of the transmission power control bit transmitted through the electric wave transmission path having the smallest transmission loss in the electric wave transmission paths between the mobile station MS and the base stations BS1 and BS2. This process is the same as in the example shown in FIG. 6.

Accordingly, when the transmission paths between the mobile station MS and the base stations BS1 and BS2 are relatively in good conditions (i.e., when the fading frequency is relatively low), a transmission power control signal for the mobile station MS is determined based on both of the transmission power control bits transmitted from the base stations BS1 and BS2. When the transmission paths between the mobile station MS and the base stations BS1 and BS2 are not in very good conditions (i.e., when the fading frequency is relatively high), a transmission power control signal for the mobile station MS is determined based on the transmission power control bit transmitted through the most preferable transmission path (having the smallest transmission loss). As a result, transmission power control can be performed on the mobile station MS, while the more preferable conditions of the transmission paths between the mobile station MS and the base stations BS1 and BS2 are taken into consideration.

Although a transmission power control signal obtained by the structure shown in FIG. 3 and a transmission power control signal obtained by the structure shown in FIG. 3 are switched based on the fading frequency in the above example, a transmission power control signal obtained by the structure shown in FIG. 7 or 8 can be employed instead of a transmission power control signal obtained by the structure shown in FIG. 6.

Although the mobile station MS is radio-connected to the two base stations BS1 and BS2 in each of the foregoing examples, transmission power control can also be performed for the mobile station MS through the same procedures as the above in a situation where the mobile station MS is radio-connected to three or more base stations.

In each of the foregoing examples, transmission power control information to be used in transmission power control is selected from transmission power control information transmitted from the base stations to the mobile station MS, while the transmission losses in the electric wave transmission paths between the mobile station MS and the base stations BS1 and BS2 are taken into consideration. However, the present invention is not limited to it. For instance, the reception levels of pilot signals that serve as information representing the transmission quality between the mobile station MS and each of the base station BS1 and BS2 and are measured based on pilot signals transmitted from the base stations, or a reception SINR that can be calculated from the pilot signals, can be employed instead of the transmission losses. For further simplification of the entire structure, the information representing the transmission quality should preferably be used for determining to which base station the mobile station MS is to be radio-connected.

In each of the foregoing examples, the pilot signal demodulators/transmission loss calculators 31 and 32 are equivalent to the transmission loss calculators and transmission path quality measurers in claims, and the transmission power control signal determiner 33 is equivalent to the transmission power control information determiner in claims.

Also, the weight coefficient determiner 310 and the weight correctors 311 and 312 are equivalent to the weight correctors in claims, the combiner 313 is equivalent to the combiner in claims, and the selector 334 shown in FIG. 9 is equivalent to the selector in claims.

The following is a description of embodiments of the present invention, with reference to the accompanying drawings.

Figure 10:
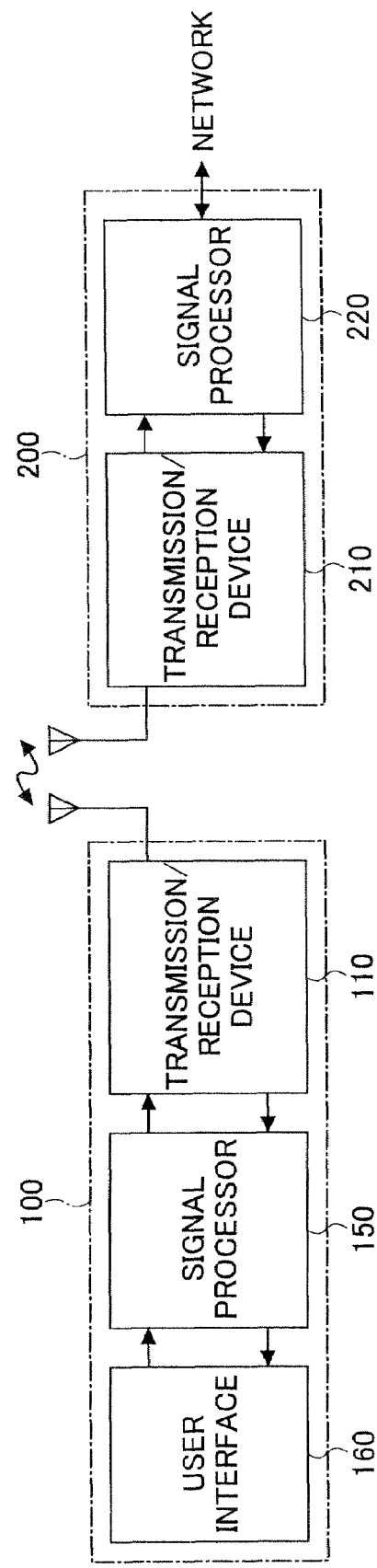
FIG. 10 is a block diagram illustrating an example structure of a mobile communication system to which a transmission power control method in accordance with an embodiment of the present invention is applied.

FIG. 10 illustrates an example of a radio communication system to which a transmission power control method in accordance with the present invention is applied. This radio communication system is a CDMA mobile communication system in which signal transmission and reception are performed among mobile stations and base stations.

As shown in FIG. 10, a mobile station 100 and a base station 200 transmit and receive signals (including packets, control signals, and audio signals) in accordance with the CDMA technique. The mobile station 100 includes a transmission/reception device 110, a signal processor 150, and a user interface 160. The base station 200 includes a transmission/reception device 210 and a signal processor 220.

Information (such as audio information, text information, or image information) inputted by a user through the user interface 160 of the mobile station 100 is processed by the signal processor 150 to generate signals in a predetermined format. The signals outputted from the signal processor 150 are supplied to the transmission/reception device 110, which performs predetermined operations such as encoding and modulation on the signals. The resultant signals are then transmitted from the transmission/reception device 110 to the base station 200.

Upon receipt of the signals from the mobile station 100, the transmission/reception device 210 of the base station 200 performs predetermined operations such as demodulation and decoding on the received signals. The signals generated from the transmission/reception device 210 are then converted by the signal processor 220 into a format that can be transmitted over the network. The converted signals are transmitted from the signal processor 220 to a communication terminal via the network.

At the base station 200, the signals supplied via the network are processed by the signal processor 220 to obtain signals in a predetermined format. The signals outputted from the signal processor 220 are supplied to the transmission/reception device 210, which performs predetermined operations such as encoding and modulation on the signals. The resultant signals are transmitted from the transmission/reception device 210 to the mobile station 100.

The transmission/reception device 110 of the mobile station 100 that has received the signals from the base station 200 then performs predetermined operations such as demodulation and decoding on the received signals. The signals generated from the transmission/reception device 110 are converted by the signal processor 150 into a format that can be handled at the user interface 160. Based on the converted signals, the information (such as audio information, text information (E-mail), or image information) is shown to the user.

The transmission/reception device 110 of the mobile station 100 performs transmission power control (uplink transmission power control), based on transmission power control bits (transmission power control information that represents a power increase or a power decrease) transmitted from the base station 200. The transmission/reception device 210 of the base station 200 also performs transmission power control (downlink transmission power control), based on transmission power control bits transmitted from the mobile station 100. Accordingly, the transmission/reception device 110 of the mobile station 100 and the transmission/reception device 210 of the base station 200 have the same structures in terms of transmission power control. In the following, the uplink transmission power control will be described in detail.

Figure 11:
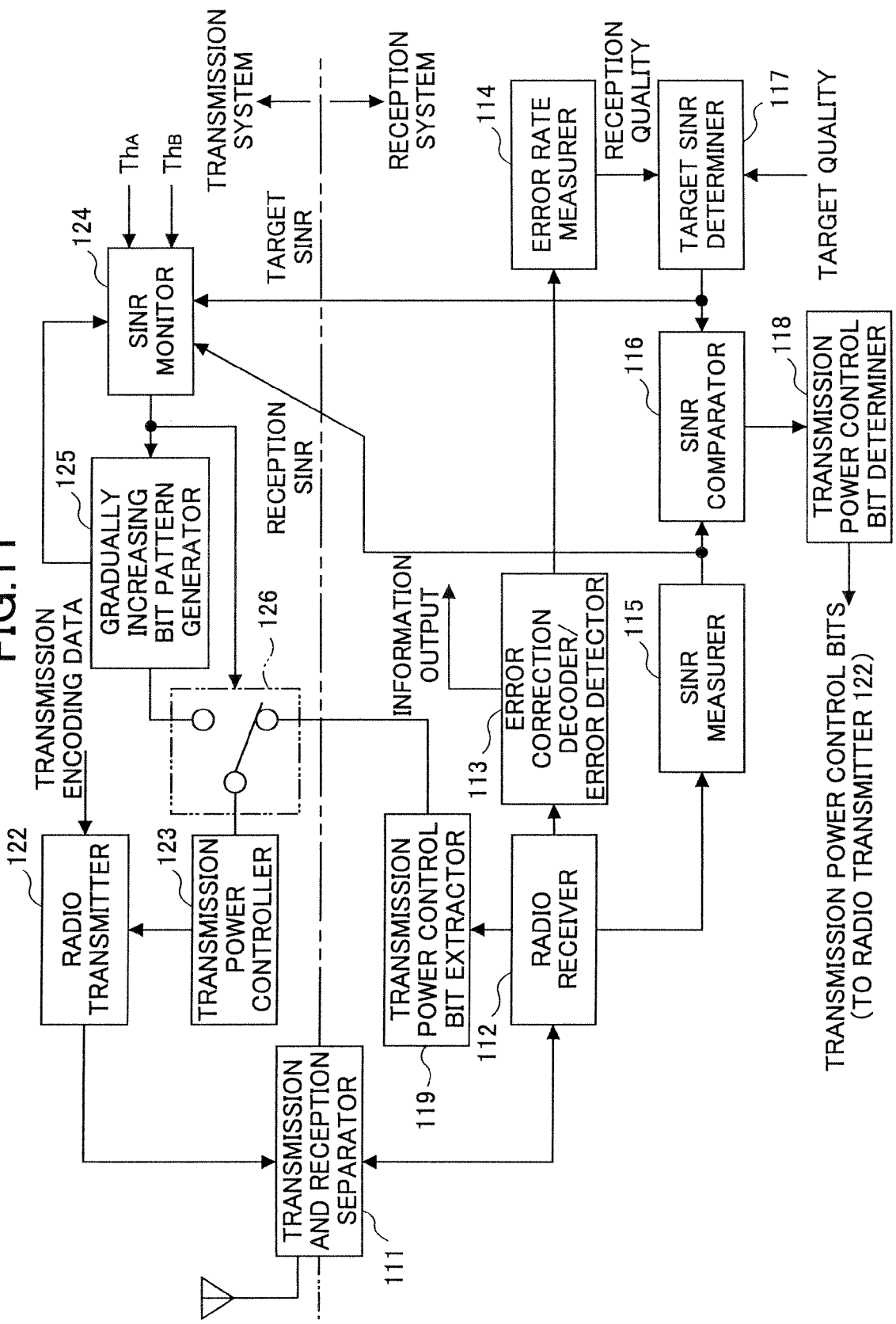
FIG. 11 is a block diagram illustrating an example structure of the transmission/reception device of the mobile station shown in FIG. 10.

The transmission/reception device 110 of the mobile station 100 may have a structure illustrated in FIG. 11.

As can be seen from FIG. 11, the transmission/reception device 110 has a transmission system and a reception system that share a transmission and reception separator 111. The reception system includes a radio receiver 112, an error correction decoder/error detector 113, an error rate measurer 114, a SINR measurer 115, a SINR comparator 116, a target SINR determiner 117, a transmission power control bit determiner 118, and a transmission power control bit extractor 119.

Signals transmitted from the base station 200 are supplied to the radio receiver 112 via the transmission and reception separator 111. The radio receiver 112 performs an inverse spread process and a demodulation process on each of the reception signals supplied from the transmission and reception separator 111, so as to generate a base band signal. As will be described later, the reception signals include a data signal corresponding to data transmitted from the base station 200 and a control signal corresponding to each transmission power control bit also transmitted from the base station 200. The base band signal obtained through the demodulation process performed on each control signal is supplied to the transmission power control bit extractor 119. The transmission power control bit extractor 119 restores the transmission power control bit from the base band signal.

The base band signal obtained through the demodulation process performed on each data signal by the radio receiver 112 is supplied to the error correction decoder/error detector 113, which performs error correction decoding for each frame, and detects a transmission error in accordance with the CRC (Cycle Redundancy Check) technique. The result of the decoding is supplied as an information output from the transmission/reception device 110 to the signal processor 150 (shown in FIG. 10). This error correction decoder/error detector 113 also outputs an error detection result that indicates whether a transmission loss exists with respect to each frame.

The error rate measurer 114 calculates a frame error rate (FER) as the reception quality of the information restored from the reception signal (the desired signal components), based on the error detection result outputted from the error correction decoder/error detector 113.

The SINR measurer 115 calculates a reception SINR (signal-to-interference plus noise power ratio) based on each reception signal obtained by the radio receiver 112. The calculation cycle is shorter than the data frame cycle. The target SINR determiner 117 determines a target SINR so that the reception quality (FER) of the information outputted from the error rate measurer 114 becomes equal to the target quality. More specifically, the target SINR determiner 117 performs such a control operation as to increase the value of the target SINR if the reception quality of the information is lower than the target quality, and to decrease the value of the target SINR if the reception quality of the information is higher than the target quality (outer loop control). The SINR comparator 116 compares the reception SINR outputted from the SINR measurer 115 with the target SINR outputted from the target SINR determiner 117, and outputs the result of the comparison.

The transmission power control bit determiner 118 determines each transmission power control bit to be used in a transmission power control operation at the base station 200, based on the comparison result outputted from the SINR comparator 116 (inner loop control). If the reception SINR is smaller than the target SINR, the reception level of the desired signal components is determined to be low, and the transmission power control bit is set at a value that indicates an increase of transmission power ("1", for example). On the other hand, if the reception SINR is greater than the target SINR, the reception level of the desired signal components is determined to be high, and the transmission power control bit is set at a value that indicates a decrease of transmission power ("0", for example). The transmission power control bit determined in this manner is supplied from the transmission power control bit determiner 118 to a radio transmitter 122 of the transmission system (described later), and is then transmitted to the base station 200.

The transmission system of the mobile station 100 performs predetermined operations on the information supplied from the signal processor 150 (shown in FIG. 10), such as adding of an error detecting parity bit to each frame in accordance with the CRC technique, and error correction encoding of the data of each frame provided with the error detecting parity bit. The encoded data are then supplied to the radio transmitter 122.

The radio transmitter 122 performs a modulation on the encoded data supplied in the above manner, and thus generates a data modulation signal. The radio transmitter 122 also performs a modulation on the transmission power control bit supplied from the transmission power control bit determiner 118, as described above, so as to generate a control bit modulation signal. The radio transmitter 122 then multiplexes the control bit modulation signal and the data modulation signal. The multiplexed signal is then subjected to a spread process using a predetermined spread code. The radio transmitter 122 transmits the signal obtained through the spread process via the transmission and reception separator 111.

The transmission system of the mobile station 100 further includes a transmission power controller 123, a SINR monitor 124, a gradually increasing bit pattern generator 125, and a switch 126.

The transmission power control bit outputted from the transmission power control bit extractor 119 of the reception system is supplied to the transmission power controller 123 via the switch 126. Here, the transmission power controller 123 controls the transmission power at the radio transmitter 122, based on the transmission power control bits transmitted from the base station 200. In this manner, the transmission power control at the radio transmitter 122 of the mobile station 100 is performed so that the reception SINR approaches the target SINR in the base station 200.

The SINR monitor 124 receives the reception SINR measured by the SINR measurer 115 and the target SINR determined by the target SINR determiner 117, and monitors the reception SINR to determine whether it is in a normal state, using a predetermined first threshold value $Th_A$ and a predetermined second threshold value $Th_B$. If the reception SINR is in a normal state, the SINR monitor 124 outputs a control signal indicating a first condition (a low level, for example). If the reception SINR is in an abnormal state, the SINR monitor 124 outputs a control signal indicating a second condition (a high level, for example).

When the control signal indicating the first condition is outputted from the SINR monitor 124, the switch 126 connects the transmission power control bit extractor 119 to the transmission power controller 123 in accordance with the control signal. As a result, the transmission power control bit is supplied from the transmission power control bit extractor 119 to the transmission power controller 123, as described earlier.

When the control signal indicating the second condition is outputted from the SINR monitor 124 (i.e., when the reception SINR is in an abnormal state), the gradually increasing bit pattern generator 125 is activated with the control signal. The gradually increasing bit pattern generator 125 generates a bit pattern corresponding to a transmission power control bit string that is designed to gradually increase transmission power (hereinafter referred to as the "gradually increasing bit pattern). Also in accordance with the control signal, the switch 126 connects the gradually increasing bit pattern generator 125 to the transmission power controller 123. As a result, the gradually increasing bit pattern generated from the gradually increasing bit pattern generator 125 is supplied to the transmission power controller 123.

Figure 12:
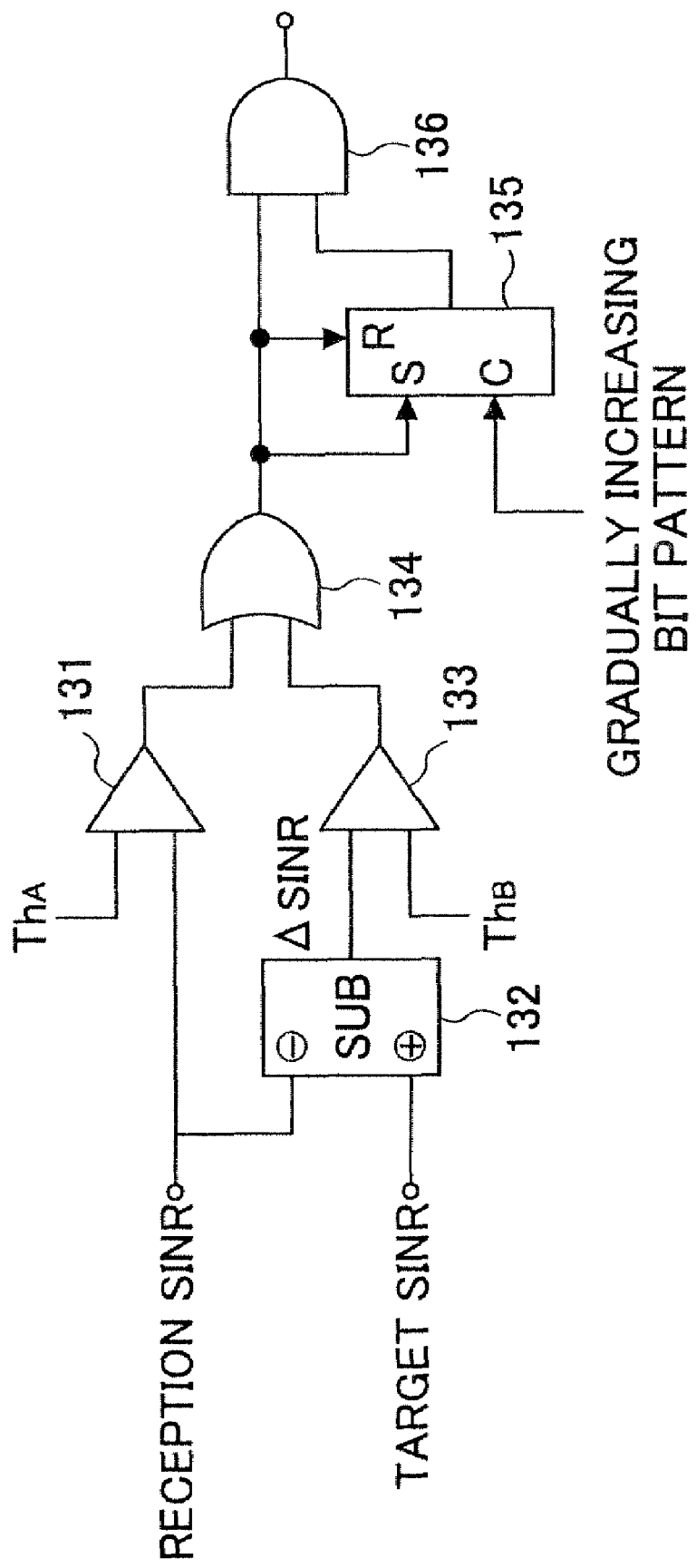
FIG. 12 illustrates an example structure of the SINR monitor of the transmission/reception device shown in FIG. 11.

The SINR monitor 124 may have a structure shown in FIG. 12.

As can be seen from FIG. 12, the SINR monitor 124 includes a comparator 131 that compares the reception SINR with the first threshold value $Th_A$, a subtractor 132 that subtracts the reception SINR from the target SINR and outputs a SINR difference value $\Delta_{SINR}$, and a comparator 133 that compares the SINR difference value $\Delta_{SINR}$ outputted from the subtractor 132 with the second threshold value $Th_B$. When the reception SINR is smaller than the first threshold value $Th_A$, the comparator 131 outputs a high-level signal, for example. When the reception SINR is equal to or greater than the first threshold value $Th_A$, the comparator 131 outputs a low-level signal, for example. When the SINR difference value $\Delta_{SINR}$ is equal to or greater than the second threshold value $Th_B$, the comparator 133 outputs a high-level signal, for example. When the SINR difference value $\Delta_{SINR}$ is smaller than the second threshold value $Th_B$, the comparator 133 outputs a low-level signal, for example.

The SINR monitor 124 further includes an OR gate 134, an up-down counter 135, and an AND gate 136. The output signals of the comparators 131 and 133 are inputted to the OR gate 134, and the output signal of the OR gate 134 is inputted to the start terminal (S) and the reset terminal (R) of the up-down counter 135 as well as the AND gate 136. The gradually increasing bit pattern generated from the gradually increasing bit pattern generator 125 is inputted to the counter terminal (C) of the up-down counter 135.

When the output signal from the OR gate 134 switches to the high level, the up-down counter 135 is reset and then restarted, and switches its output signal to the high level. When receiving a bit of the gradually increasing bit pattern representing a power increase ("1", for example), the up-down counter 135 adds 1 to the counter. When receiving a bit representing a power decrease, the up-down counter 135 subtracts 1 from the counter. When the counter value reaches a predetermined value N, the up-down counter 135 switches its output signal to the low level. The output signal of the up-down counter 135 as well as the output of the OR gate 134 are inputted to the AND gate 136. The output of the AND gate 136 is the output of the SINR monitor 124.

The counter value of the up-down counter 135 that counts up or down depending on the value of each bit of the gradually increasing bit pattern corresponds to the increase amount of the transmission control to be controlled with the gradually increasing bit pattern. The predetermined value N set by the up-down counter 135 corresponds to the upper limit of the increase amount of the transmission power to be controlled with the gradually increasing bit pattern.

Figure 13:
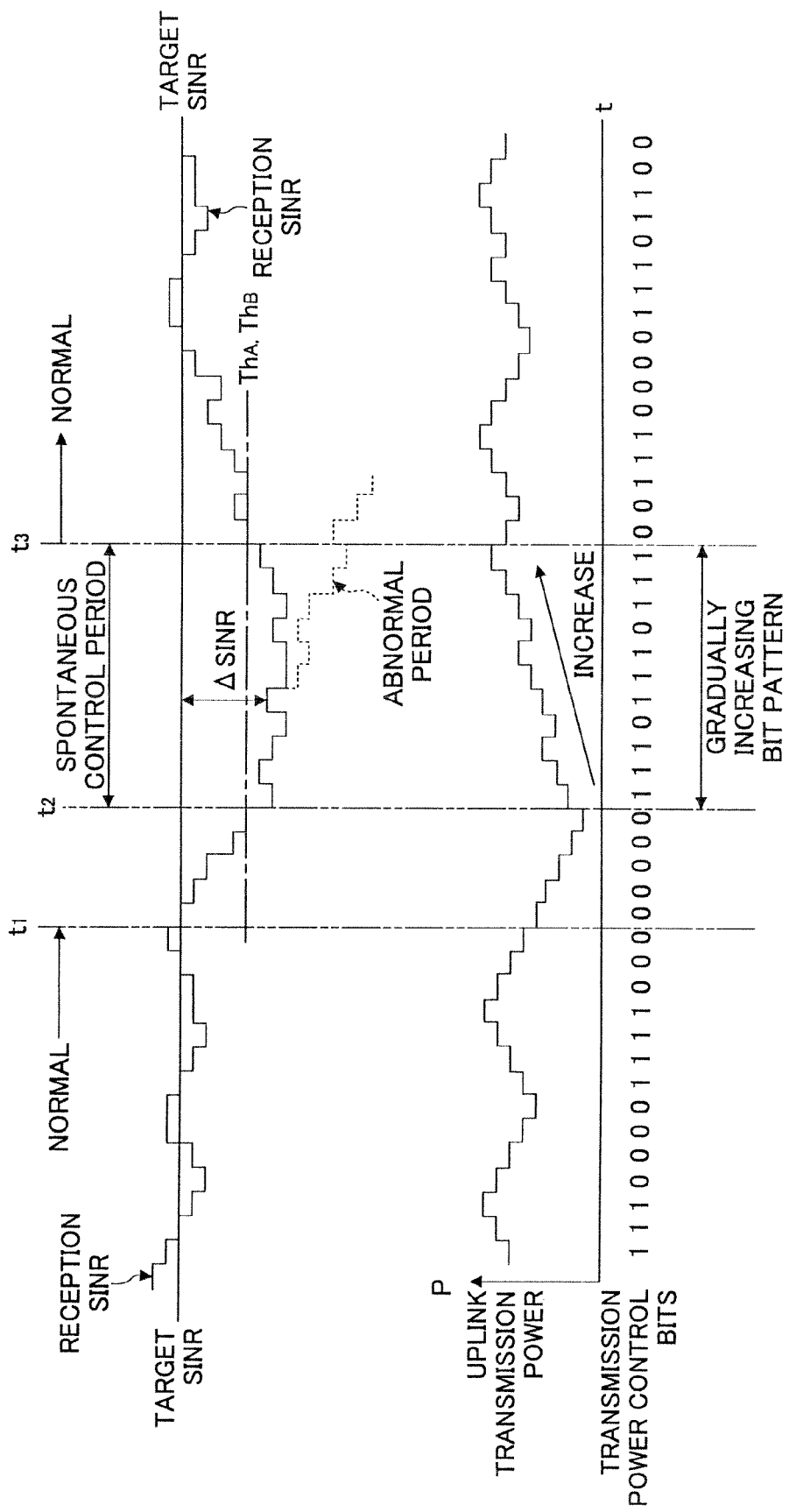
FIG. 13 illustrates examples of the conditions of the reception SINR at the mobile station and examples of the conditions of transmission power control based on the reception SINR.

In the mobile station 100 having the above structure, the transmission power control (the uplink transmission power control) shown in FIG. 13 is performed.

As shown in FIG. 13, while the reception SINR is fluctuating within a relatively narrow range around the target SINR (during the period until time t1), the reception SINR is equal to or greater than the first threshold value $Th_A$, and the SINR difference value $\Delta_{SINR}$ representing the difference between the target SINR and the reception SINR is smaller than the second threshold value $Th_B$. Accordingly, both outputs of the comparators 131 and 133 in the SINR monitor 124 are of the low level, and the control signal outputted from the SINR monitor 124 represents the first condition (the low level). Upon receipt of the control signal, the switch 126 connects the transmission power control bit extractor 119 to the transmission power controller 123. Based on the transmission power control bits ( . . . 11100001111000) that are transmitted from the base station 200 and extracted by the transmission power control bit extractor 119, the transmission power controller 123 performs transmission power control on the radio transmitter 122. This situation is a normal situation, and the transmission power control at the mobile station 100 is performed in such a manner that the reception SINR at the base station 200 approaches the target SINR.

At this point, the quality of the reception signal from the base station 200 deteriorates for some reason, and the reception SINR drops (during the period between time t1 and time t2). In such a situation, based on the relationship between the reception SINR and the target SINR, the transmission power control bit determiner 118 generates a transmission power control bit to increase the transmission power of the base station 200, and the transmission bit is transmitted from the mobile station 100 to the base station 200. Despite that, the quality of the reception signal from the base station 200 deteriorates, and the reception SINR becomes smaller than the first threshold value $Th_A$ (at time t2). The output of the comparator 131 of the SINR monitor 124 then switches to the high level. With that, the up-down counter 135 is activated, and the output signal of the up-down counter 135 switches to the high level. As a result, the AND gate 136, i.e., the SINR monitor 124, outputs a control signal representing the second condition (the high level).

As the control signal outputted from the SINR monitor 124 switches to the second condition, the gradually increasing bit pattern generator 125 is activated, and the switch 126 connects the gradually increasing bit pattern generator 125 to the transmission power controller 123. As a result, the transmission power controller 123 performs the transmission power control on the radio transmitter 122, based on the gradually increasing bit pattern outputted from the gradually increasing bit pattern generator 125.

If the gradually increasing bit pattern is "11101110111", three transmission power increases by a predetermined amount (1 dB, for example) and a transmission power decrease by a predetermined amount are alternately performed so as to gradually increase the transmission power. During this process, as the reception quality of the transmission power control bits transmitted from the mobile station 100 to the base station 200 is improved, normal transmission power control is performed at the base station 200, based on the transmission power control bits generated in the mobile station 100.

In this manner, transmission power control is autonomously performed at the mobile station 100 based on the gradually increasing bit pattern, regardless of the transmission power control bits transmitted from the base station 200. Accordingly, the reception SINR measured by the SINR measurer 115 of the mobile station 100 does not exhibit the abnormal behavior of further dropping as indicated by the dotted line in FIG. 13, but gradually increases. When the reception SINR exceeds the first threshold value $Th_A$ at time t3, the output of the comparator 131 of the SINR monitor 124 drops to the low level. As a result, the control signal outputted from the SINR monitor 124 switches to the first condition (the low level). The switch 126 then connects the transmission power control bit extractor 119 to the transmission power controller 123. Based on the transmission power control bits "00111000011 . . . " that are transmitted from the base station 200 and extracted by the transmission power control bit extractor 119, the transmission power controller 123 performs transmission power control on the radio transmitter 122 in the same manner as in the normal situation.

In the mobile station 100, the target SINR is controlled based on the quality of received information (FER) (outer loop control). Because of this, monitoring only the absolute value of the reception SINR does not necessarily help to detect an abnormality in the reception SINR. Therefore, the SINR difference value $\Delta_{SINR}$ obtained by subtracting the reception SINR from the target SINR is compared with the second threshold value $Th_B$. Based on the comparison result, transmission power control is performed.

Even if the reception SINR is equal to or greater than the first threshold value $Th_A$, the output of the comparator 133 of the SINR monitor 124 switches to the high level when the SINR difference value $\Delta_{SINR}$ becomes equal to or greater than the second threshold value $Th_B$, and the control signal representing the second condition (the high level) is outputted from the SINR monitor 124, as in the foregoing example. With the control signal representing the second condition, transmission power control is autonomously performed based on the gradually increasing bit pattern in the same manner as described above.

Also, if the reception SINR cannot be improved promptly while transmission power control is autonomously performed based on the gradually increasing bit pattern, the counter value of the up-down counter 135 of the SINR monitor 124 reaches the predetermined value N before the reception SINR becomes equal to or greater than the first threshold value $Th_A$. In other words, the amount of the transmission power increase reaches the upper limit. As a result, the output signal from the up-down counter 135 drops to the low level, and the control signal outputted from the SINR monitor 124 switches to the first condition. Thus, the autonomous transmission power control based on the gradually increasing bit pattern is suspended, and the regular transmission power control based on the transmission power control bits transmitted from the base station 200 is started.

In this manner, when the counter value of the up-down counter 135 that increases or decreases the counter value depending on the value of each bit in the gradually increasing bit pattern reaches the predetermined value N, the autonomous transmission power control based on the gradually increasing bit pattern is suspended, so as to prevent an unnecessary increase of the transmission power with no likelihood that the reception SINR will be improved.

By the above transmission power control at the mobile station 100, the transmission power at the mobile station 100 is gradually increased, when the reception SINR is not improved though the transmission power control bits generated based on the reception SINR are transmitted to the base station 200. Thus, the quality of the transmission power control bits received by the base station 200 can be improved. With the improvement of the quality of the transmission power control bits received by the base station 200, the transmission power control can be accurately performed at the base station 200, and the reception SINR measured at the mobile station 100 can be prevented from continuously decreasing below a predetermined quality (the target SINR).

The first threshold value $Th_A$ and the second threshold value $Th_B$ are set at values that are experimentally determined based on the actual communication states in the mobile communication system. The predetermined value N corresponding to the upper limit of a transmission power increase to be set in the up-down counter 135 is determined so as to keep balance between the improvement characteristics of the reception SINR and efficient power control.

In the above example, whether the reception SINR is normal is determined from the result of a comparison between the reception SINR and the first threshold value $Th_A$ and the result of a comparison between the SINR difference value $\Delta_{SINR}$ and the second threshold value $Th_B$. However, whether the reception SINR is normal can also be determined from one of the above comparison results. Particularly in a case where transmission power control is performed with the target SINR as a fixed value, whether the reception SINR is normal should be determined from only one of the above two comparison results.

The methods of determining whether the reception SINR is normal using a threshold value are not limited to the above examples, but a threshold value used when the reception SINR goes through a transition from a normal state to an abnormal state can be different from a threshold value used when the reception SINR goes through a transition from an abnormal state to a normal state. Also, when the state (a normal state or an abnormal state) that can be determined with a threshold value lasts over a predetermined period of time, a final determination on the state can be made. Further, any other known determination method that uses a threshold value can be employed.

In the above examples, the transmission power is gradually increased with the gradually increasing bit pattern, combining power increases and power decreases. However, the transmission power may also be gradually increased by a control operation in which the transmission power is alternately increased from the current level and maintained at the current level.

In the above examples, the transmission power is gradually increased until the reception SINR is improved. However, if the reception SINR is determined to be abnormal, the transmission power may be increased by a predetermined amount at once, and, while the situation is maintained, whether the reception SINR can be improved within a predetermined period of time is determined. If the reception SINR is improved to a certain degree within the predetermined period of time, the regular transmission power control is resumed. In order to prevent unnecessary control operations maintaining the relatively high transmission power while the reception SINR is not being improved, the regular transmission power control may be resumed after the predetermined period of time has passed even though the reception SINR has not been improved to the certain degree.

Also, in the above examples, the regular transmission power control based on the transmission power control is resumed, when the transmission power increase amount reaches the upper limit (i.e., when the counter value of the up-down counter 135 reaches the predetermined value N) while the transmission power is autonomously controlled based on the gradually increasing bit pattern. However, the transmission power value may be fixed at the point where the transmission power increase amount reaches the upper limit.

The reception SINR used in the SINR monitor 124 is a value measured for each slot in the above examples. However, the average value among two or more slots may be employed.

In a case where the mobile station 100 is radio-connected to a plurality of base stations through soft handovers, the transmission power control described above can be performed based on the reception SINR with respect to a composite reception signal obtained by combining reception signals from the base stations.

Although the transmission power control is performed at the mobile station 100 in the above examples, it may be performed at the base station 200.

In the above examples, the SINR monitor 124 corresponds to the quality determining step (or the quality determiner), and the gradually increasing bit pattern generator 125 and the switch 126 correspond to the autonomous control step (or the autonomous controller) in claims.

The comparator 131 shown in FIG. 12 corresponds to the first threshold value determining step (or the first threshold value determiner) in claims. The subtractor 132 shown in FIG. 12 corresponds to the difference value calculating step (or the difference value calculator) in claims. The comparator 133 shown in FIG. 12 corresponds to the second threshold value determining step (or the second threshold value determiner) in claims.

The gradually increasing bit pattern generator 125 also corresponds to the autonomous transmission power control information generating step (or the autonomous transmission power control information generator) in claims. The switch 126 also corresponds to the control switching step (or the control switcher) in claims. The up-down counter 135 shown in FIG. 12 corresponds to the determining step (or the determiner), and the AND gate 136 corresponds to the autonomous control stopping step (or the autonomous control stopper) in claims.

In the following, further embodiments of the present invention will be described, with reference to the accompanying drawings.

A mobile communication system to which a transmission power control method in accordance with the present invention will be applied has the same structure as the mobile communication system shown in FIG. 10.

In the structure shown in FIG. 10, a mobile station 100 and a base station 200 perform transmission and reception of signals (including packets, control signals, and audio signals) in accordance with the CDMA technique. The mobile station 100 includes a transmission/reception device 110, a signal processor 150, and a user interface 160. The base station 200 includes a transmission/reception device 210 and a signal processor 220.

Information (such as audio information, text information, or image information) inputted by a user through the user interface 160 of the mobile station 100 is processed by the signal processor 150 to generate signals in a predetermined format. The signals outputted from the signal processor 150 are supplied to the transmission/reception device 110, which performs predetermined operations such as encoding and modulation on the signals. The resultant signals are then transmitted from the transmission/reception device 110 to the base station 200.

Upon receipt of the signals from the mobile station 100, the transmission/reception device 210 of the base station 200 performs predetermined operations such as demodulation and decoding on the received signals. The signals generated from the transmission/reception device 210 are then converted by the signal processor 220 into a format that can be transmitted over the network. The converted signals are transmitted from the signal processor 220 to a communication terminal via the network.

At the base station 200, the signals supplied via the network are processed by the signal processor 220 to obtain signals in a predetermined format. The signals outputted from the signal processor 220 are supplied to the transmission/reception device 210, which performs predetermined operations such as encoding and modulation on the signals. The resultant signals are transmitted from the transmission/reception device 210 to the mobile station 100.

The transmission/reception device 110 of the mobile station 100 that has received the signals from the base station 200 then performs predetermined operations such as demodulation and decoding on the received signals. The signals generated from the transmission/reception device 110 are converted by the signal processor 150 into a format that can be handled at the user interface 160. Based on the converted signals, the information (such as audio information, text information (E-mail), or image information) is shown to the user.

The transmission/reception device 110 of the mobile station 100 performs transmission power control (uplink transmission power control), based on transmission power control bits (transmission power control information that represents a power increase or a power decrease) transmitted from the base station 200. The transmission/reception device 210 of the base station 200 also performs transmission power control (downlink transmission power control), based on transmission power control bits transmitted from the mobile station 100.

Figure 14:
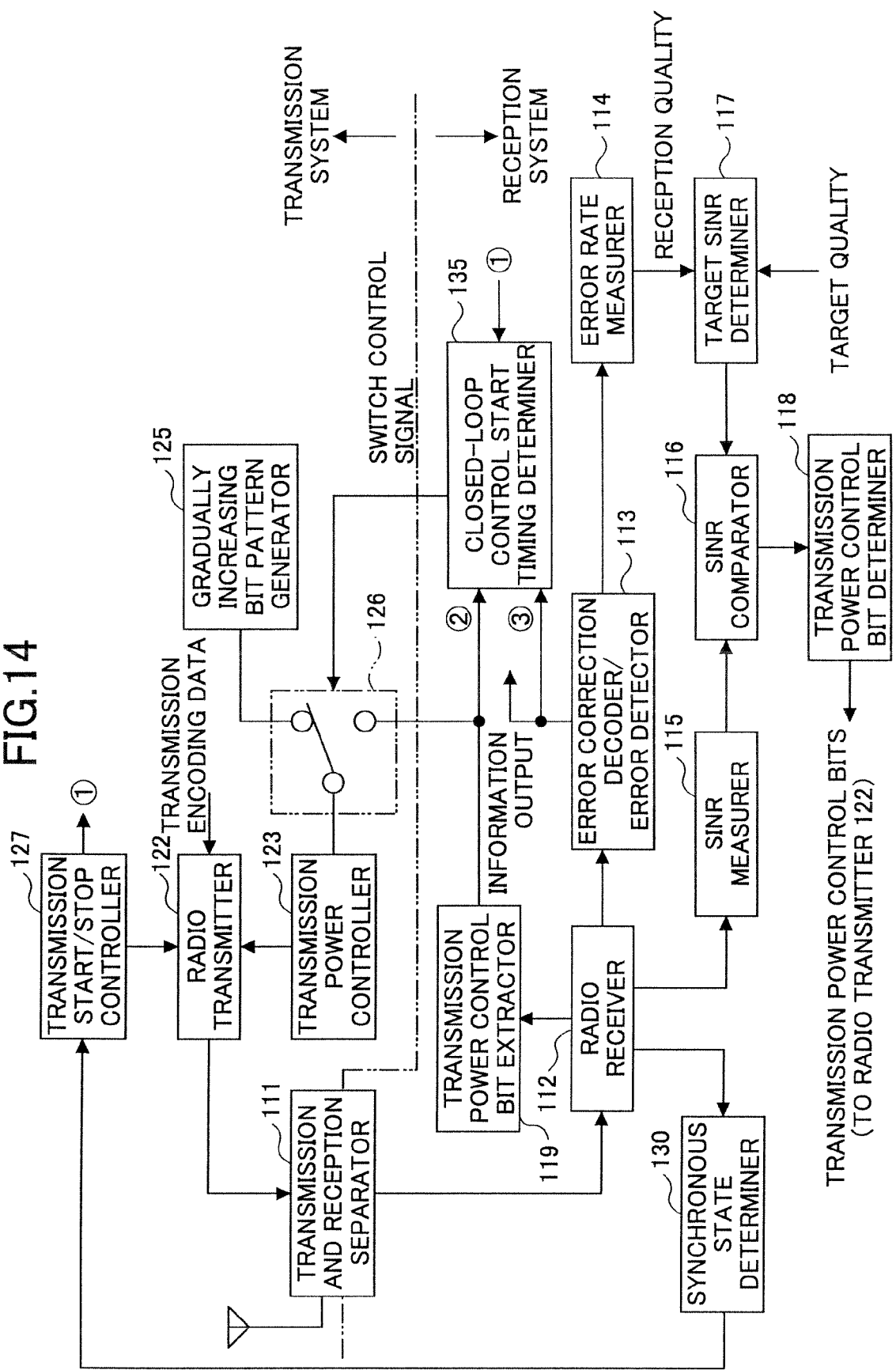
FIG. 14 is a block diagram illustrating an example structure of the transmission/reception device of a mobile station.

The transmission/reception device 110 of the mobile station 100 may have a structure illustrated in FIG. 14.

As can be seen from FIG. 14, the transmission/reception device 110 has a transmission system and a reception system that share a transmission and reception separator 111. The reception system includes a radio receiver 112, an error correction decoder/error detector 113, an error rate measurer 114, a SINR measurer 115, a SINR comparator 116, a target SINR determiner 117, a transmission power control bit determiner 118, and a transmission power control bit extractor 119.

Signals transmitted from the base station 200 are supplied to the radio receiver 112 via the transmission and reception separator 111. The radio receiver 112 performs an inverse spread process and a demodulation process on each of the reception signals supplied from the transmission and reception separator 111, so as to generate a base band signal. As will be described later, the reception signals include a data signal corresponding to data transmitted from the base station 200 and a control signal corresponding to each transmission power control bit also transmitted from the base station 200. The base band signal obtained through the demodulation process performed on each control signal is supplied to the transmission power control bit extractor 119. The transmission power control bit extractor 119 restores each transmission power control bit from the base band signal.

The base band signal obtained through the demodulation process performed on each data signal by the radio receiver 112 is supplied to the error correction decoder/error detector 113, which performs error correction decoding for each frame, and detects a transmission error in accordance with the CRC (Cycle Redundancy Check) technique. The result of the decoding is supplied as information output from the transmission/reception device 110 to the signal processor 150 (shown in FIG. 10). This error correction decoder/error detector 113 also outputs an error detection result that indicates whether a transmission loss exists with respect to each frame.

The error rate measurer 114 calculates a frame error rate (FER) as the reception quality of the information restored from the reception signal (the desired signal components), based on the error detection result outputted from the error correction decoder/error detector 113.

The SINR measurer 115 calculates a reception SINR (signal-to-interference plus noise power ratio) based on each reception signal obtained by the radio receiver 112. The calculation cycle is shorter than the data frame cycle. The target SINR determiner 117 determines a target SINR so that the reception quality (FER) of the information outputted from the error rate measurer 114 becomes equal to the target quality. More specifically, the target SINR determiner 117 performs such a control operation as to increase the value of the target SINR if the reception quality of the information is lower than the target quality, and to decrease the value of the target SINR if the reception quality of the information is higher than the target quality (outer loop control). The SINR comparator 116 compares the reception SINR outputted from the SINR measurer 115 with the target SINR outputted from the target SINR determiner 117, and outputs the result of the comparison.

The transmission power control bit determiner 118 determines each transmission power control bit to be used in a transmission power control operation at the base station 200, based on the comparison result outputted from the SINR comparator 116 (inner loop control). If the reception SINR is smaller than the target SINR, the reception level of the desired signal components is determined to be low, and the transmission power control bit is set at a value that indicates an increase of transmission power ("1", for example). On the other hand, if the reception SINR is greater than the target SINR, the reception level of the desired signal components is determined to be high, and the transmission power control bit is set at a value that indicates a decrease of transmission power ("0", for example). The transmission power control bit determined in this manner is supplied from the transmission power control bit determiner 118 to a radio transmitter 122 of the transmission system (described later), and is then transmitted to the base station 200.

The reception system having the above structure further includes a synchronous state determiner 130 and a closed-loop control start timing determiner 135.

Before starting actual uplink communication to transmit data directed to the base station 200, the mobile station 100 transmits and receives signals in a certain format to and from the base station 200, so as to establish synchronization. In this operation to establish synchronization, the radio receiver 112 performs synchronization initiation based on a signal supplied from the base station 200, and establishes synchronization through the synchronization initiation.

The synchronous state determiner 130 monitors the synchronization initiation performed by the radio receiver 112, and determines whether synchronization (uplink synchronization) has been established. Determining that synchronization has been established, the synchronous state determiner 130 outputs a synchronization establishing signal. The closed-loop control start timing determiner 135 includes a timer function, and outputs a switch control signal for switching pieces of transmission power control information to be used in a transmission power control operation of the transmission/reception device 110 during the operation to establish synchronization. The functions of the closed-loop control start timing determiner 135 will be described later in detail.

The transmission system of the mobile station 100 performs predetermined operations on the information supplied from the signal processor 150 (shown in FIG. 10), such as adding of an error detecting parity bit to each frame in accordance with the CRC technique, and error correction encoding of the data of each frame provided with the error detecting parity bit. The encoded data are then supplied to the radio transmitter 122.

The radio transmitter 122 performs a modulation on the encoded data supplied in the above manner, and thus generates a data modulation signal. The radio transmitter 122 also performs a modulation on the transmission power control bit supplied from the transmission power control bit determiner 118, as described above, so as to generate a control bit modulation signal. The radio transmitter 122 then multiplexes the control bit modulation signal and the data modulation signal. The multiplexed signal is then subjected to a spread process using a predetermined spread code. The radio transmitter 122 transmits the signal obtained through the spread process via the transmission and reception separator 111.

The transmission system of the mobile station 100 further includes a transmission power controller 123, a gradually increasing bit pattern generator 125, a switch 126, and a transmission start/stop controller 127.

The transmission power controller 123 controls the transmission power at the radio transmitter 122, based on the transmission power control bits that are transmitted from the base station 200 and extracted by the transmission power control bit extractor 119 via the switch 126, or based on the transmission power control bits generated from the gradually increasing bit pattern generator 125 (these transmission power control bits will be hereinafter referred to as the "gradually increasing bit pattern"). The gradually increasing bit pattern generated from the gradually increasing bit pattern generator 125 serves as transmission power control bits to increase the transmission power at a slower rate than the increase rate of transmission power that is controlled based on transmission power control bits "1, 1, 1, 1, . . . " that indicate a continuous power increase. The gradually increasing bit pattern may have a pattern "1, 1, 0, 1, 1, 0, 1, 1, 0, . . . " in which a set of two bits "1" indicating power increases and a single bit "0" indicating a power decrease appear alternately.

As already described, when a synchronization establishing signal is outputted from the synchronous state determiner 130, the transmission start/stop controller 127 prompts the radio transmitter 122 to transmit a signal in a predetermined format that is essential for the synchronizing operation at the base station 200. More specifically, the transmission start/stop controller 127 outputs a transmission start signal ① to prompt the radio transmitter 122 to transmit a signal in the predetermined format. The closed-loop control start timing determiner 135 contains a timer that is activated with the transmission start signal ① outputted from the transmission start/stop controller 127. The closed-loop control start timing determiner 135 determines whether the time measured by the timer has become equal to or longer than a predetermined time. When the measured time has become equal to or longer than the predetermined time, the closed-loop control start timing determiner 135 outputs a switch control signal.

Before the mobile station 100 starts transmitting information data to the base station 200, the switch 126 normally connects the transmission power controller 123 to the gradually increasing bit pattern generator 125. In this situation, the transmission power controller 123 performs a transmission power control operation for the radio transmitter 122, based on the gradually increasing bit pattern generated from the gradually increasing bit pattern generator 125. When the switch control signal is outputted from the closed-loop control start timing determiner 135, the switch 126 switches the connections of the transmission power controller 123 to the transmission power control bit extractor 119. In this situation, the transmission power controller 123 performs a transmission power control operation for the radio transmitter 122, based on the transmission power control bits that are transmitted from the base station 200 and extracted by the transmission power control bit extractor 119 (closed-loop control).

Like the transmission/reception device 110 of the mobile station 100, the transmission/reception device 210 of the base station 200 determines each transmission power control bit based on the reception SINR with respect to reception signals from the mobile station 100, and transmits the transmission power control bit to the mobile station 100. Also, the transmission/reception device 210 of the base station 200 performs transmission power control in accordance with transmission power control bits transmitted from the base station 100.

In the mobile communication system having the above structure, before a start of information data transmission between the base station 200 and the mobile station 100, the base station 200 and the mobile station 100 transmit and receive various types of information through a common control channel, and then transmit and receive signals in a predetermined format using individual channels (spread code channels) selected based on the various types of information, so as to perform an operation to establish synchronization. The essential procedures in the operation to establish synchronization are the same as the procedures shown in FIG. 21.

Figure 21:
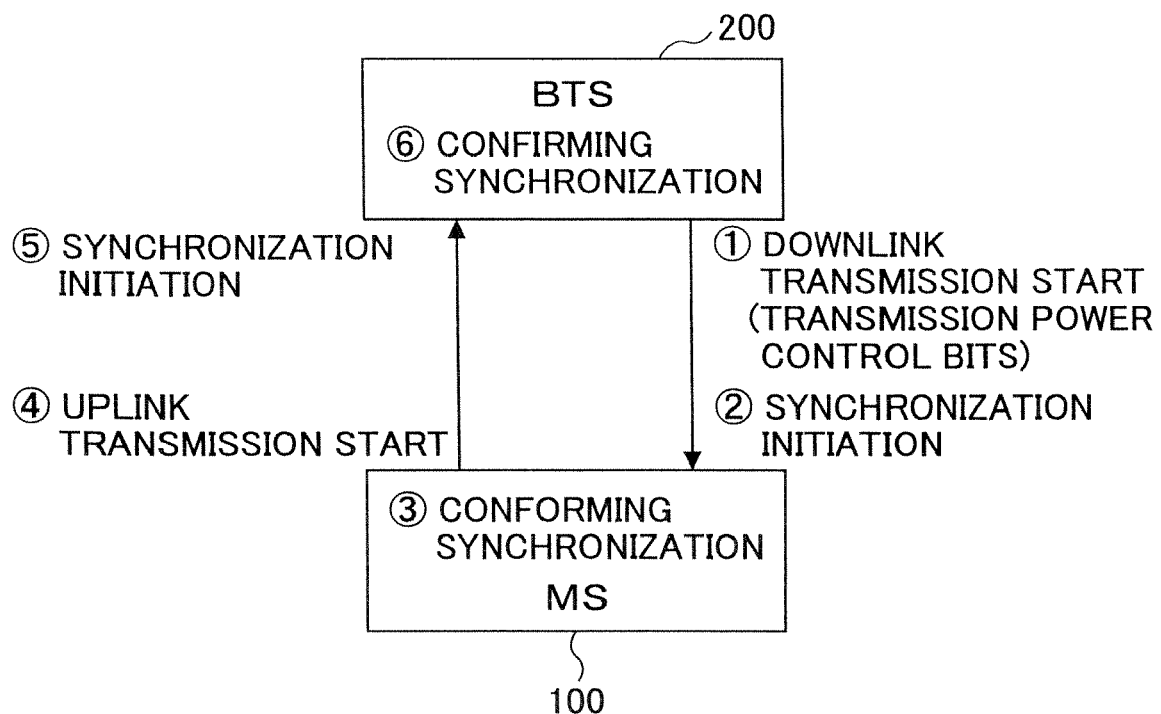
FIG. 21 illustrates procedures of establishing synchronization between a mobile station and a base station.
Figure 22:
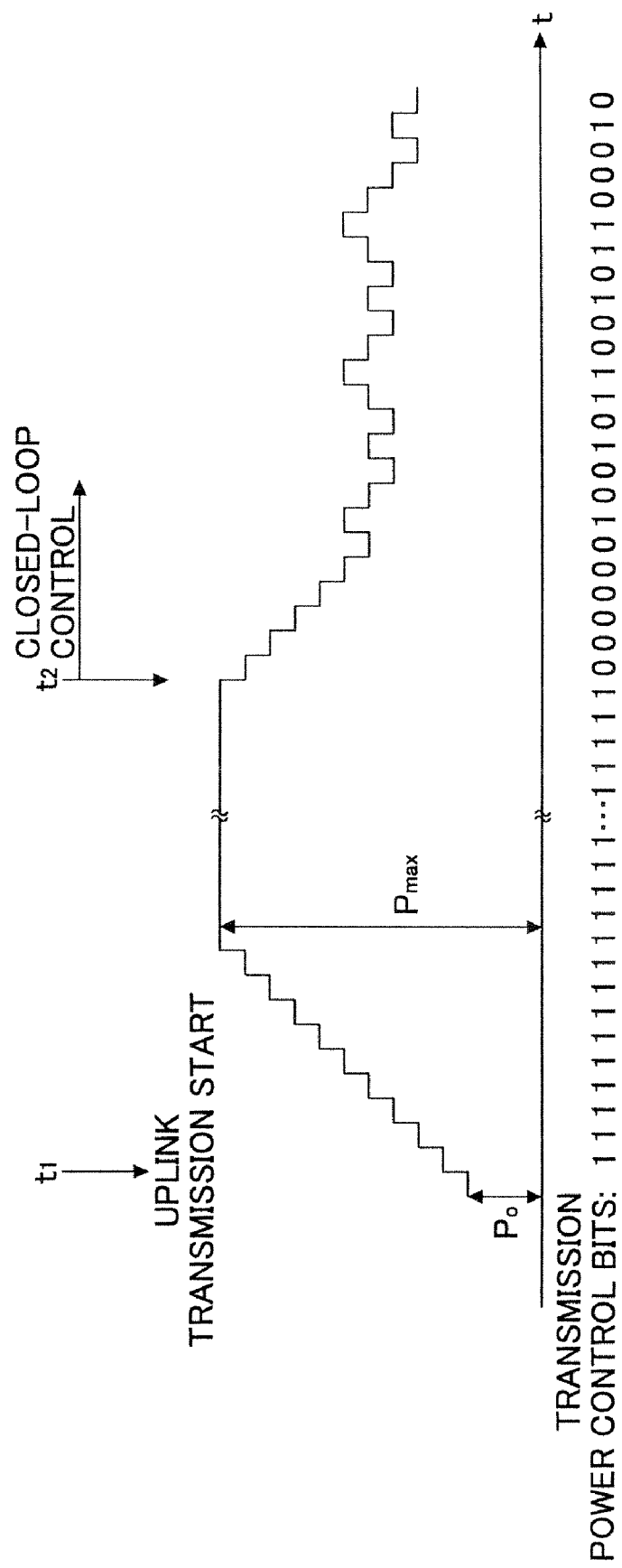
FIG. 22 illustrates a transmission power control operation at a mobile station in accordance with a conventional transmission power control method.

In the operation to establish synchronization, when synchronization is established at the mobile station 100 (③ in FIG. 21), the radio transmitter 122, which is under the control of the transmission start/stop controller 127 based on the synchronization establishing signal outputted from the synchronous state determiner 130 of the transmission/reception device 110, starts transmitting a signal in the predetermined format (④ in FIG. 21). A transmission power control operation in response to the signal is performed in the manner shown in FIG. 15. At the same time as the start of the transmission power control operation, the timer in the closed-loop control start timing determiner 135 is activated with the transmission start signal ① transmitted from the synchronous state determiner 130.

The base station 200 needs to start downlink transmission (see ① in FIG. 21) while not receiving information or data transmitted from the mobile station 100. Accordingly, the base station 200 transmits a pattern of transmission power control bits "1, 1, 1, 1, . . . " representing a continuous power increase, like a base station in a conventional system.

Figure 15:
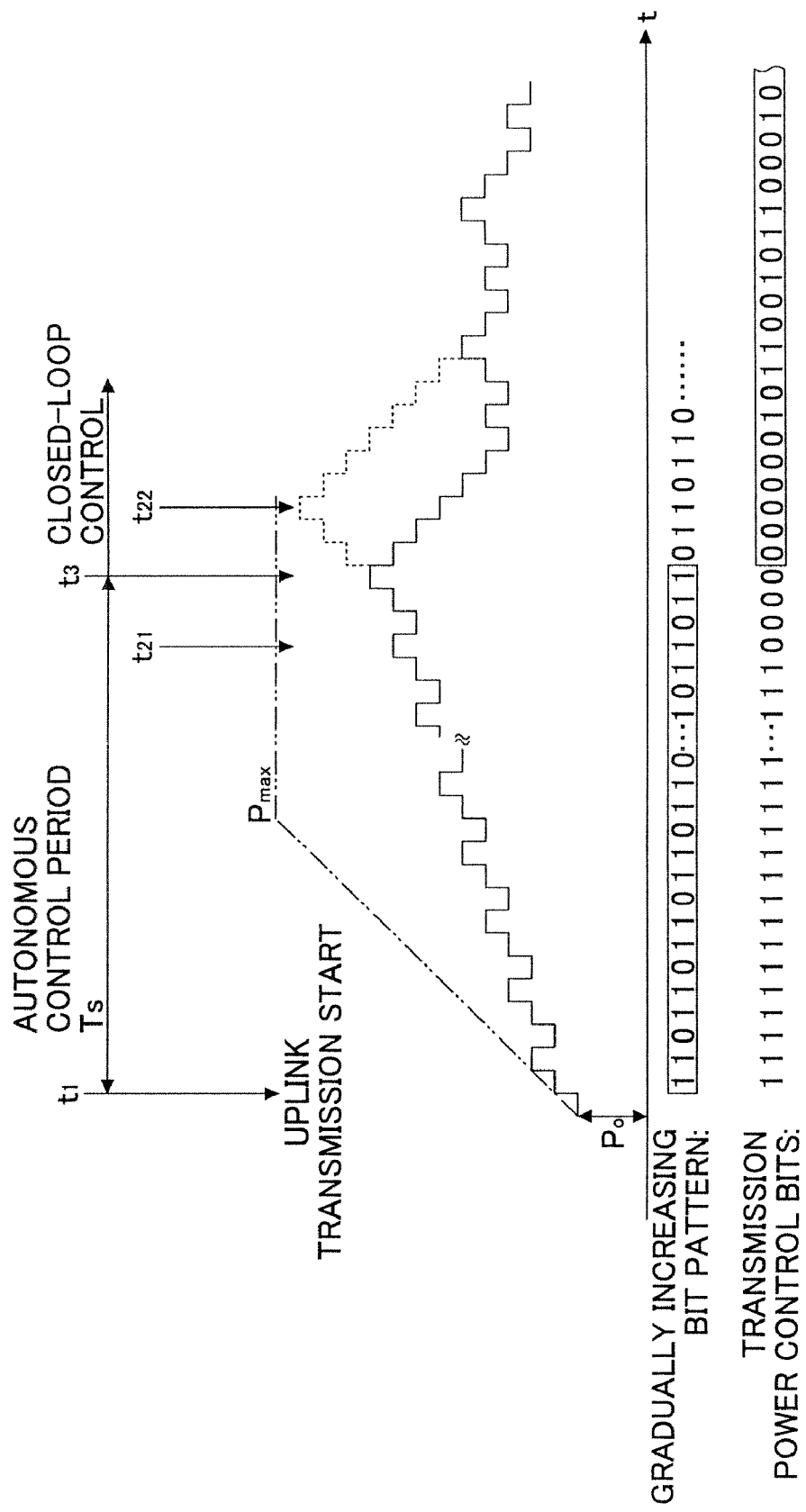
FIG. 15 illustrates a first example of the transmission power control performed at the mobile station.

As can be seen from FIG. 15, when synchronization is established at the base station 100 and a signal in the predetermined format is transmitted from the radio transmitter 122 at time t1, a gradually increasing bit pattern "1, 1, 0, 1, 1, 0, . . . " generated from the gradually increasing bit pattern generator 125 starts being supplied to the transmission power controller 123 via the switch 126. In accordance with the gradually increasing bit pattern, the transmission power controller 123 gradually increases the transmission power of the radio transmitter 122 from an initial value P0 determined based on a transmission loss or the like. In this case, the increase characteristics of the transmission power exhibit a slower change than the change of transmission power in accordance with transmission power control bits "1, 1, 1, 1, . . . " transmitted from the base station 200 (indicated by the dots-and-dash line).

While the predetermined signal is being transmitted from the radio transmitter 122, with the transmission power being gradually increased, synchronization initiation is performed at the base station 200 based on the predetermined signal (⑤ in FIG. 21). For instance, when synchronization is established at the base station at time t21, the base station 200 starts outputting transmission power control bits each determined based on the reception SINR with respect to signals from the mobile station 100, instead of the above transmission power control bits "1, 1, 1, 1, . . . " representing a continuous power increase.

At time t21 when synchronization is established at the base station 200, the closed-coop control start timing determiner 135 determines that the time measured by the timer has not yet become equal to or longer than the predetermined time (an autonomous control period Ts), and therefore the transmission power controller 123 continues the transmission power control in accordance with the gradually increasing bit pattern. At time t3, the closed-loop control start timing determiner 135 determines that the time measured by the timer has become equal to or longer than the predetermined time, and then outputs a switch control signal. Upon receipt of this switch control signal, the switch 126 switches the connections of the transmission power controller 123 to the transmission power control bit extractor 119. After that, transmission power control for the radio transmitter 122 is performed in accordance with the transmission power control bits that are determined based on the reception SINR with respect to signals from the mobile station 100 and transmitted from the base station 200 (closed-loop control).

As the transmission power at the radio transmitter 122 is controlled in accordance with the transmission power control bits transmitted from the base station 200, the transmission power gradually decreases after time t3, so that the reception SINR at the base station 200 can be maintained at a preferable value that is close to the target SINR. In this situation, the transmission/reception device 110 of the mobile station 100 starts actual uplink communication to transmit signals including transmission data at a predetermined timing.

In the transmission power control operation for the mobile station 100 before a start of information data transmission between the base station 200 and the mobile station 100, after synchronization is established at the mobile station 100, the transmission power is controlled in accordance with the gradually increasing bit pattern "1, 1, 0, 1, 1, 0, . . . " while signals are being transmitted from the mobile station 100. Thus, a rapid increase of transmission power that is often observed with the conventional system can be prevented. Even with the transmission power control in accordance with the gradually increasing bit pattern, the reception quality (the reception SINR) at the base station 200 quickly reaches such a transmission power value that a desired quality (the target SINR) can be maintained. Accordingly, synchronization can be established at the base station 200 in a relatively early stage.

The predetermined time set in the timer of the closed-loop control start timing determiner 135 is determined based on an estimated time required for establishing synchronization at the base station 200 based on signals transmitted from the base station 100, while the transmission power control is being performed in accordance with the gradually increasing pit pattern. In general, the predetermined time is set slightly longer than the estimated time. However, the establishment of synchronization at the base station 200 might require a longer time than the predetermined time, depending on the conditions of the transmission path between the mobile station 100 and the base station 200.

In such a situation, transmission power control is performed in accordance with the transmission power control bits "1, 1, 1, 1, . . . " representing a continuous power increase transmitted from the base station 200, during the period between time t3 when the transmission power control operation is switched from the transmission power control in accordance with the gradually increasing bit pattern to the transmission power control in accordance with the transmission power control bits transmitted from the base station 200, and time t22 when synchronization is actually established at the base station 200, as shown in FIG. 15. In this case, a transmission power increase at the mobile station 100 can be restricted to a relatively small amount (see the characteristics curve indicated by the dotted line in FIG. 15), because the period of time between time t3 and time t22 is generally short even though the transmission power increases during that period.

If the period of time between time t3 and time t22 becomes long, the transmission path between the base station 200 and the mobile station 100 is in a very bad condition. In such a case, the transmission power of the mobile station 100 needs to be increased to a value great enough to establish synchronization at the base station 200. Accordingly, the transmission power control in accordance with the transmission power control bits representing a continuous power increase during the period between time t3 and time t22 serves that purpose.

Figure 16:
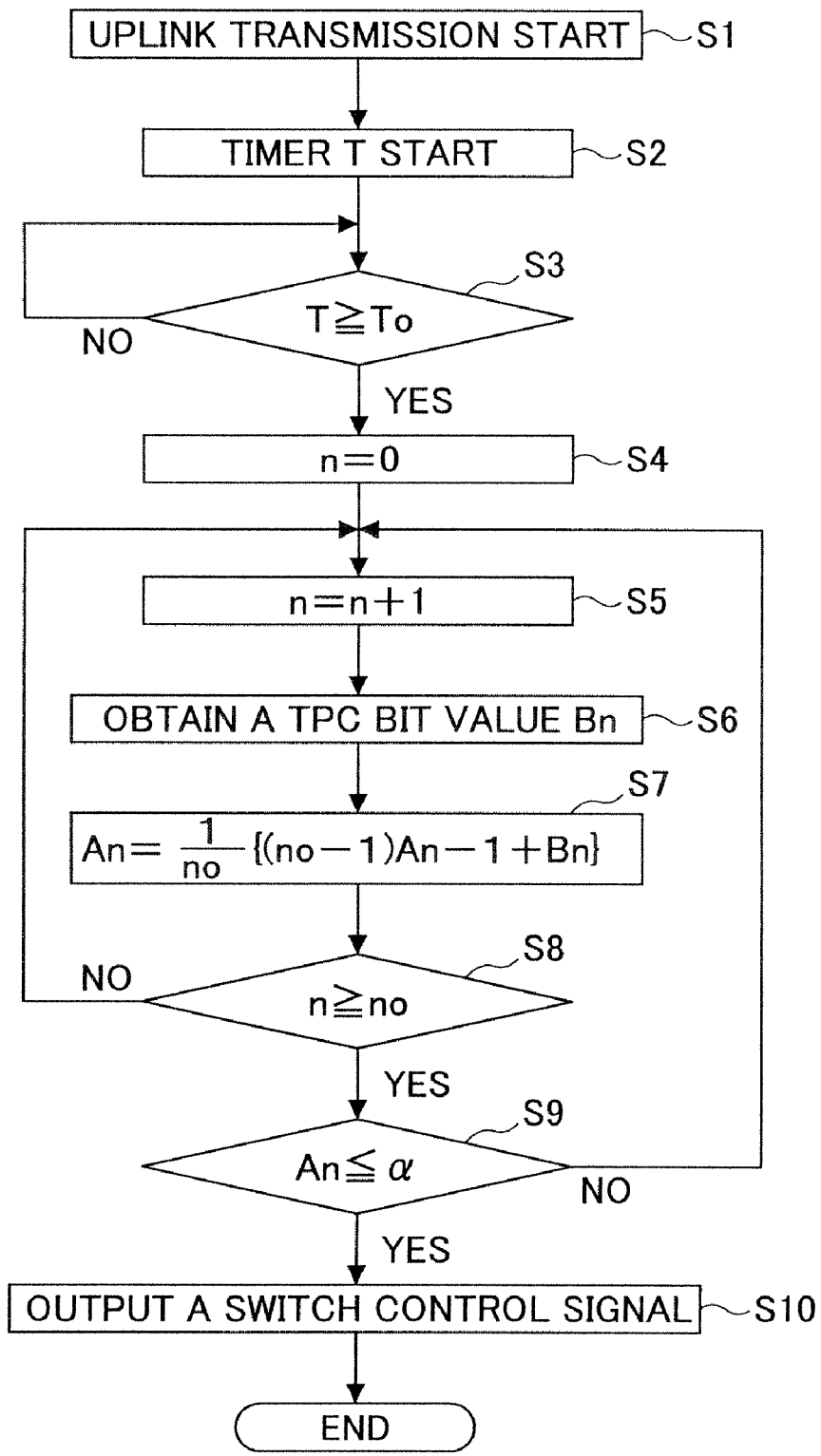
FIG. 16 is a flowchart showing an example of procedures carried out by the closed-loop control timing determiner of the transmission/reception device.

The closed-loop control start timing determiner 135 may output a switch control signal to switch transmission power control operations through the procedures shown in FIG. 16. In this example, the closed-loop control start timing determiner 135 determines the timing to switch transmission power control operations, based on the transmission start signal ① transmitted from the transmission start/stop controller 127 and the transmission power control bits ② that are transmitted from the base station 200 and extracted by the transmission power control bit extractor 119, as shown in FIG. 14.

Figure 17:
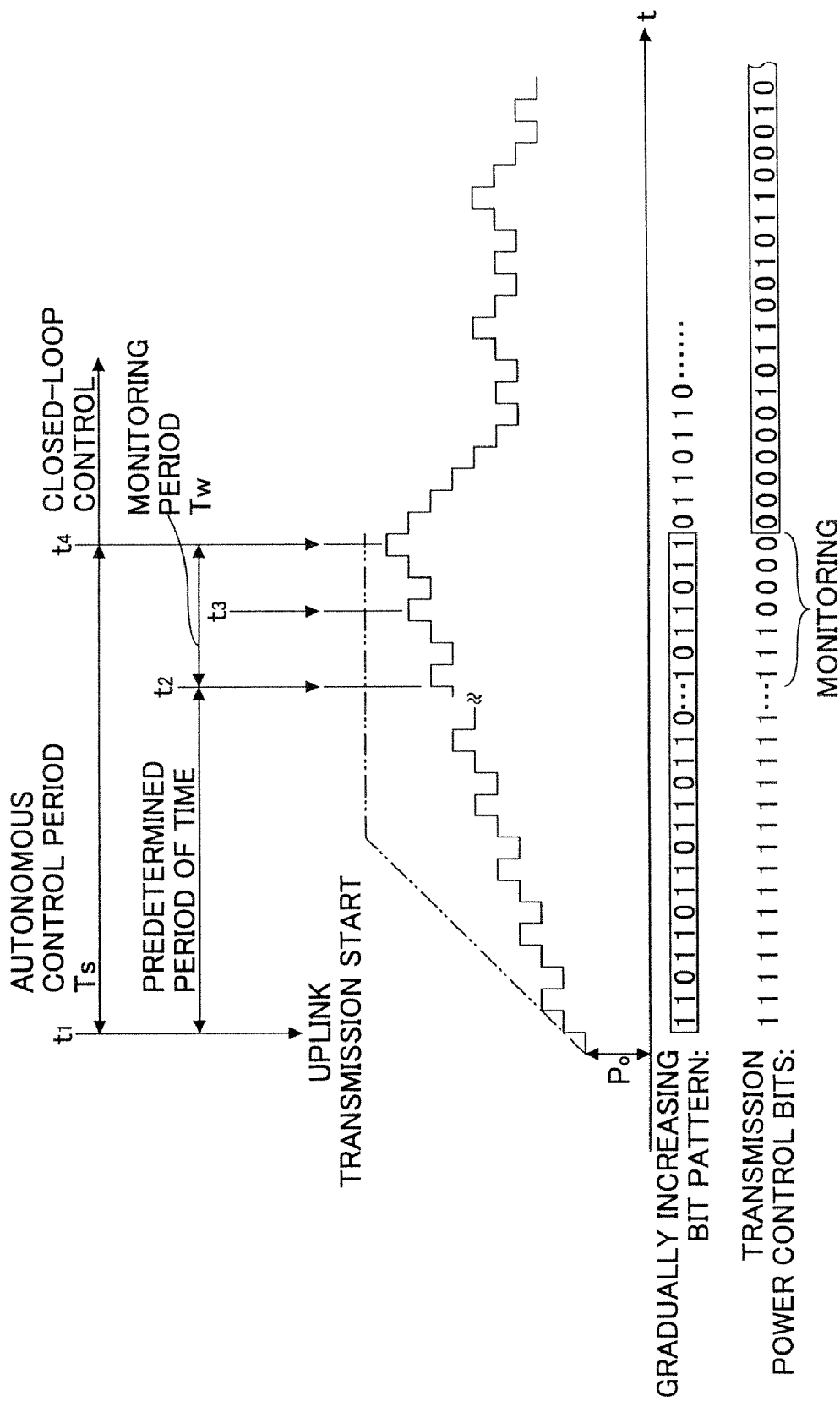
FIG. 17 illustrates a second example of the transmission power control performed at the mobile station.

Through the procedures of FIG. 16 that are carried out by the closed-loop control start timing determiner 135, the transmission power of the radio transmitter 122 of the mobile station 100 may change in the manner shown in FIG. 17.

In FIG. 16, when a start of transmission of signals (an uplink transmission start: see ④ in FIG. 21) used for establishing synchronization at the base station 200 from the radio transmitter 122 prompted by the transmission start signal ① (S1) the timer T is activated (S2). It is determined whether the time measured by the timer T has become equal to or longer than a predetermined time T0 (S3). If the time measured by the timer T is not equal to or longer than the predetermined time T0 ("NO" in S3), the transmission power controller 123 controls the transmission power of the radio transmitter 122 in accordance with the gradually increasing bit pattern generated from the gradually increasing bit pattern generator 125 in the same manner as in the foregoing embodiments. As a result, the transmission power of the radio transmitter 122 gradually increases, exhibiting relatively gentle characteristics curve in accordance with the gradually increasing bit pattern.

When the time measured by the timer T becomes equal to the predetermined time at time t2 shown in FIG. 17, a counter n is reset to zero (S4), and is then incremented by +1 (S5). The closed-loop control start timing determiner 135 obtains a value Bn ("1" or "0": hereinafter referred to as the "TPC bit value") of a single transmission power control bit that is transmitted from the base station 200 and extracted by the transmission power control bit extractor 119 (S6). Using this TPC bit value Bn, the mobile average value An is calculated by the following equation (S7):

$$A_n = \frac{1}{n_0}\{(n_0 - 1)A_{n-1} + B_n\} \tag{1}$$

Until the counter value n reaches a predetermined value n0 (S8), the incrementing of the counter n (S5), the obtaining of the TPC bit value Bn (S6), and the calculation of the mobile average value An (S7) are repeated. When the counter value n reaches the predetermined value n0 ("YES" in S8), the mobile average value An obtained at this point represents the average value of the TPC bit values B1 through Bn0 of a number n0 of continuous bits. Here, each TPC bit value is "1" or "0". The mobile average value An is a value that reflects the ratio of the number of TPC bit values "0" to the number of TPC bit values "1" involved in the average value calculation (see the above equation (1)).

More specifically, where synchronization has not been established at the base station 200, the mobile average value An should be "1", because all the transmission power control bits transmitted from the base station 200 represent "1". On the other hand, immediately after synchronization is established at the base station 200, the ratio of TPC bit values Bn representing "0" becomes higher, and the mobile average value An becomes smaller than 1, because transmission power control bits determined based on the reception quality (the reception SINR) of signals from the mobile station 100 are outputted from the base station 200.

Accordingly, when the counter value n excesses the predetermined value n0, it is determined whether the average mobile value An of the TPC bit values Bn is equal to or smaller than a reference value α (0<α<1) (S9). Until the mobile average value An becomes equal to or smaller than the reference value α, the calculation of the mobile average value An using the obtained TPC bit values Bn is repeated (S6 and S7).

After synchronization is established at the base station 200 at time t3 shown in FIG. 17 while those steps (S5, S6, S7, S8, and S9) are being repeated, the ratio of transmission power control bits representing "0" transmitted from the base station 200 becomes higher. At time t4 (shown in FIG. 17) when the mobile average value An becomes equal to or smaller than the reference value α ("YES" in S9), the closed-loop control start timing determiner 135 outputs a switch control signal (S10).

Upon receipt of the switch control signal, the switch 126 connects the transmission power controller 123 to the transmission power control bit extractor 119, and the transmission power controller 123 performs a transmission power control operation for the radio transmitter 122 based on the transmission power control bits that are transmitted from the base station 200 and extracted by the transmission power control bit extractor 119. Accordingly, after time t4 shown in FIG. 17, the transmission power of the radio transmitter 122 gradually decreases, and the transmission power value is controlled so that the reception SINR of the mobile station 100 can be substantially maintained at the target SINR at the base station 200.

In the above example, all the transmission power control bits transmitted from the base station 200 are "1" until synchronization is established at the base station 200. Once synchronization is established, the transmission power control bits determined based on the reception quality (the reception SINR) of signals from the mobile station 100 (closed-loop transmission power control bits) are transmitted from the base station 200. In view of this, the closed-loop control start timing determiner 135 determines whether synchronization has been established at the base station 200. More specifically, the closed-loop control start timing determiner 135 detects a change in the transmission power control bits transmitted from the base station 200, the change being from the transmission power control bit pattern only consisting of bits representing "1" to the transmission power control bit pattern including both bits representing "0" and "1". Detecting such a change, the closed-loop control start timing determiner 135 determines that synchronization has been established at the base station 200.

Based on the ratio of the number of transmission power control bits representing "1" to the number of transmission power control bits representing "0", not only the time to end the transmission power control in accordance with the gradually increasing bit pattern, but also the total number of the transmission power control bits representing "0" over a predetermined period of time can be determined.

In FIG. 17, the period between time t2 and time t4 represents the period during which those steps 5S through S9 shown in FIG. 16 are repeated (a monitoring period Tw). During the monitoring period Tw, the transmission power control bits transmitted from the base station 200 are monitored, and a transmission power control operation for the radio transmitter 122 is performed in accordance with the gradually increasing bit pattern.

The monitoring of the transmission power control bits transmitted from the base station 200 can be started at time t2 when the signal transmission from the mobile station 100 is started. In the above example, however, the transmission power control is not monitored during a predetermined period of time T0 starting from time t2 when the signal transmission from the mobile station 100 is started. Because of this, even if a reception error of a transmission power control bit is found during that period, the error bit is not counted for the monitoring. Accordingly, the transmission power control bits need to be monitored only during the period in which the transmission power control bit pattern is expected to change. Thus, the burden on the mobile station 100 can be reduced.

Figure 18:
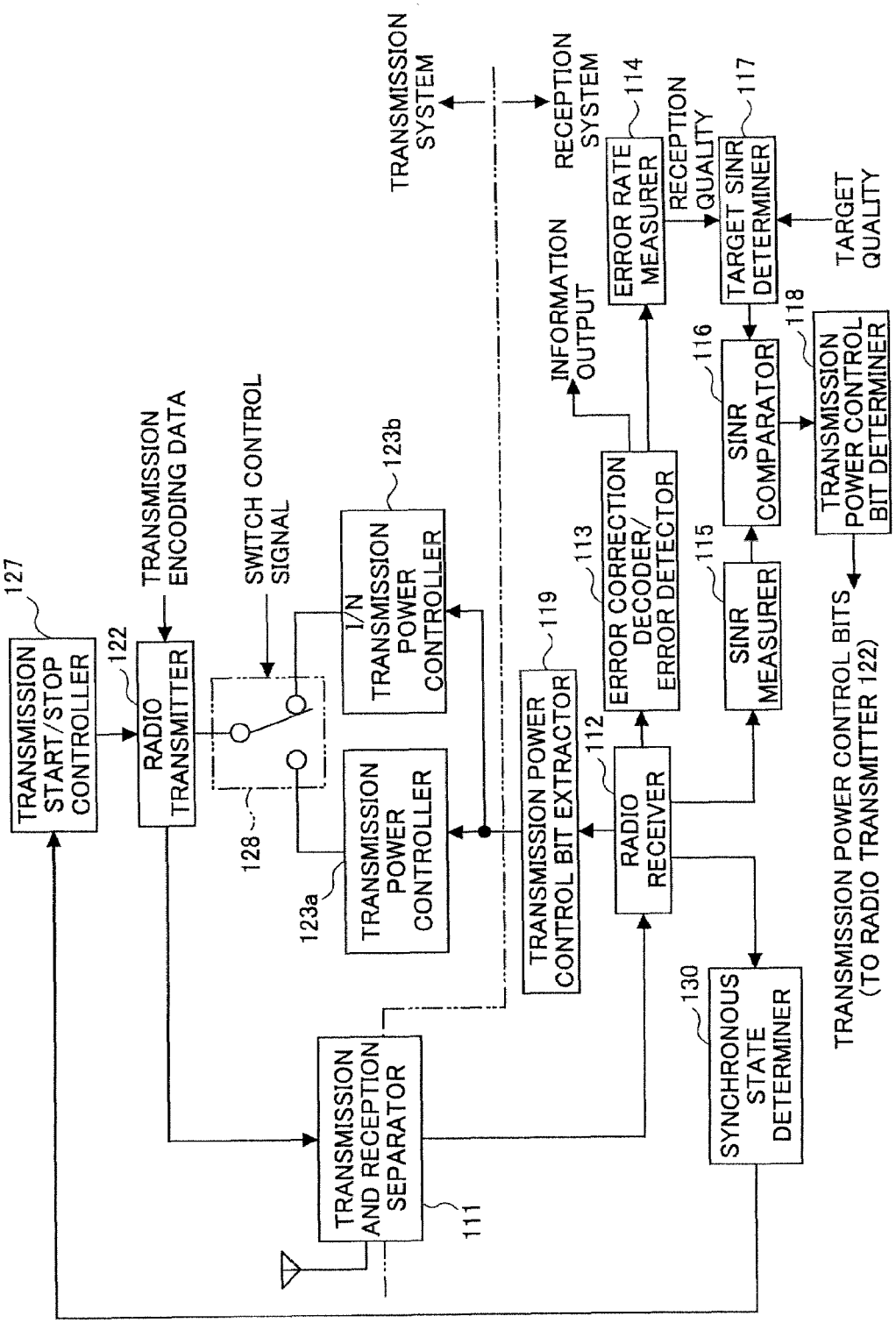
FIG. 18 is a block diagram illustrating yet another example structure of the transmission/reception device of the mobile station.

The transmission/reception device 110 of the mobile station 100 may also have the structure shown in FIG. 18. In this example, transmission power control information (hereinafter referred to as the "I/N transmission power control bits") for controlling transmission power in accordance with gentler changing characteristics than the change of transmission power with transmission power control bits transmitted from the base station 200 are generated when signals in a predetermined format are transmitted from the mobile station 100 to the base station 200 after synchronization is established at the mobile station 100. In accordance with the I/N transmission power control bits, the transmission power at the mobile station 100 is controlled. In FIG. 18, the same components as those shown in FIG. 14 are denoted by the same reference numerals also as those in FIG. 14.

Like the previous example, the transmission/reception deice 110 shown in FIG. 18 has a transmission system and a reception system that share a transmission and reception separator 111. Like the previous example, the reception system includes a radio receiver 112, an error correction decoder/error detector 113, an error rate measurer 114, a SINR measurer 115, a SINR comparator 116, a target SINR determiner 117, a transmission power control bit determiner 118, a transmission power control bit extractor 119, and a synchronous state determiner 130. Also, like the previous example, the transmission system includes a radio transmitter 122 and a transmission start/stop controller 127.

The transmission system further includes a transmission power controller 123*a*, an I/N transmission power controller 123*b*, and a control switch 128. Receiving a switch control signal from a predetermined controller (not shown), the control switch 128 switches the connections of the radio transmitter 122 from the I/N transmission power controller 123*b* to the transmission power controller 123*a*. The transmission power controller 123*a* receives transmission power control bits that are transmitted from the base station 200 and extracted by the transmission power control bit extractor 119 via the control switch 128. The transmission power controller 123*a* then performs transmission power control on the radio transmitter 122 based on the transmission power control bits. Each of the transmission power control bits is allotted to one slot. In accordance with the transmission power control bits, the transmission power controller 123*a* updates the transmission power of the radio transmitter 122 in each slot.

The I/N transmission power controller 123*b* scans each N bits (3 bits, for example) of the transmission power control bits that are transmitted from the base station 200 and extracted by the transmission power control bit extractor 119. By doing so, the I/N transmission power controller 123*b* determines a representative bit that represents the majority of values among each N bits of the transmission power control bits (the representative bits will be hereinafter referred to as the "I/N transmission power control bits"). In accordance with the I/N transmission power control bits, the I/N transmission power controller 123*b* updates the transmission power of the radio transmitter 122 in each N slots.

Figure 19:
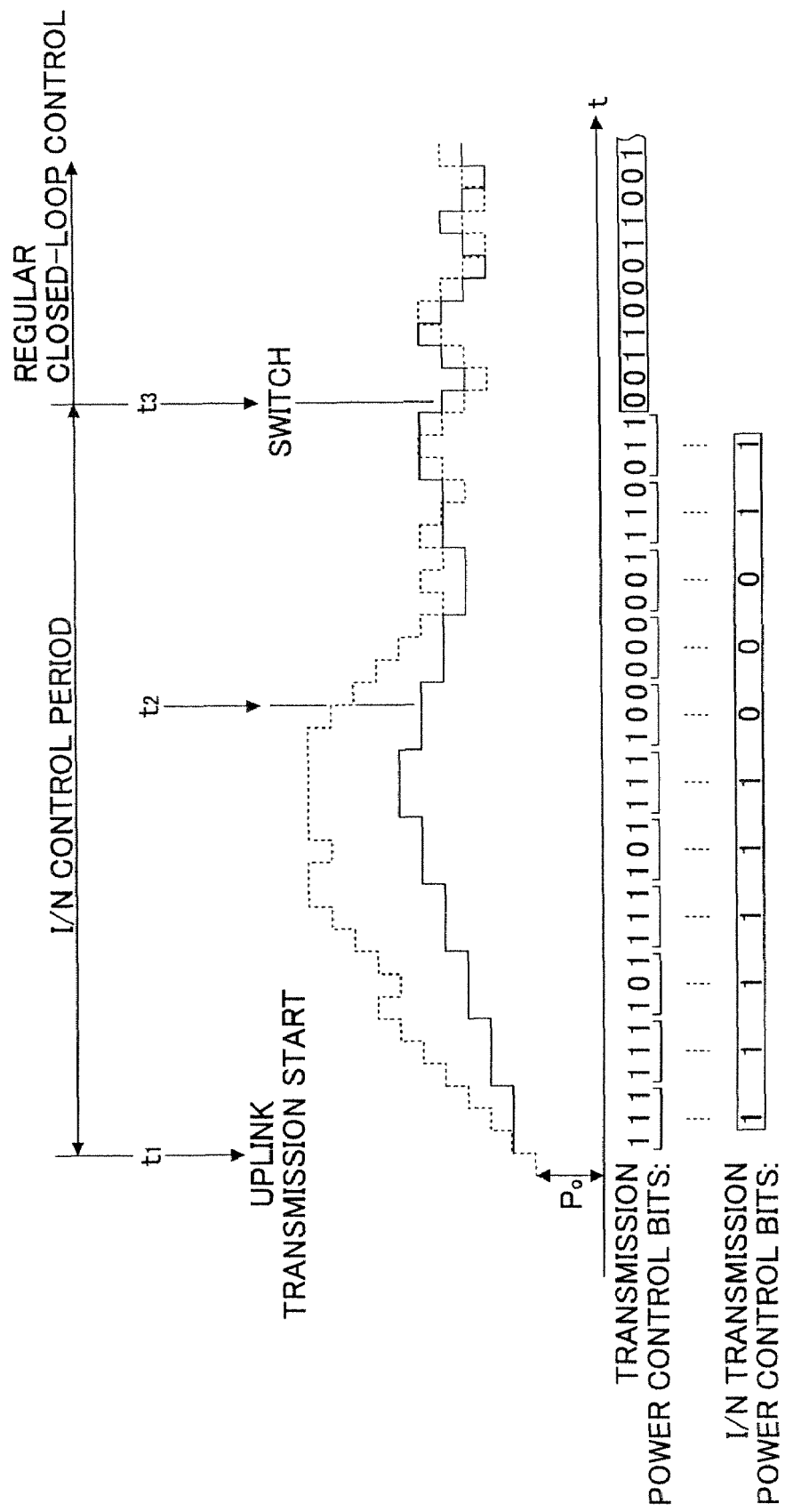
FIG. 19 illustrates a third example of the transmission power control performed at the mobile station.
Figure 20:
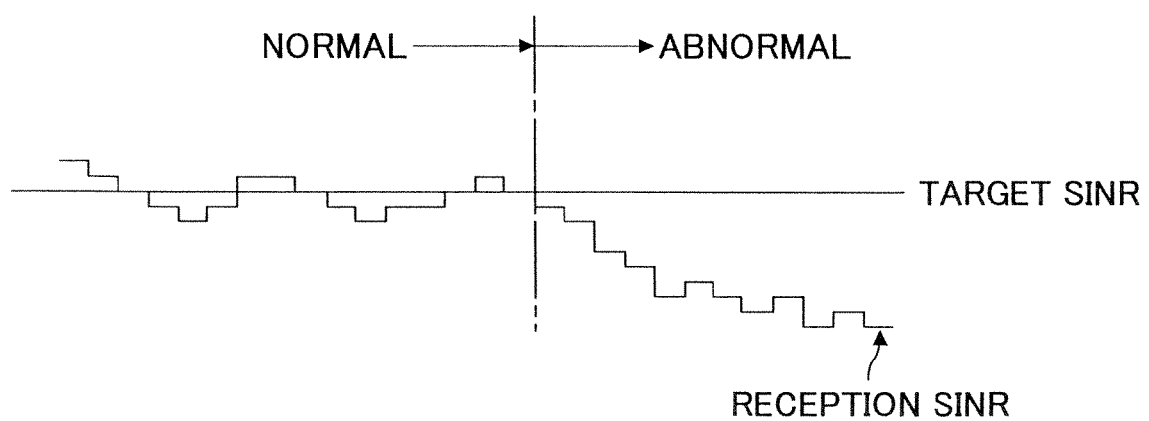
FIG. 20 illustrates examples of the conditions of the reception SINR in accordance with a conventional transmission power control method.

For instance, after synchronization is established at the mobile station 100 and the transmission of signals in a predetermined format from the radio transmitter 122 is started at time t1, the I/N transmission power controller 123*b* updates the transmission power of the radio transmitter 122 from the initial value in each 3 slots (N=3), based on the I/N transmission power control bits generated from the transmission power control bits, as shown in FIG. 19.

If the transmission power control bits are "111111101111101111100000001110011", the I/N transmission power control bits are "..1..1..1..1..1..1..0..0..0..1..1..", as shown in FIG. 19.

The transmission power updated in each 3 slots based on the I/N transmission power control bits changes more slowly than the transmission power updated in each slot based on the original transmission power control bits (see the characteristics curve indicated by the dotted line, and the characteristics curve indicated by the solid line in FIG. 19). Accordingly, synchronization can be established at the base station 200, without unnecessary power consumption.

While the above transmission power control is being performed, synchronization can be established at the base station 200 based on signals transmitted from the mobile station at time t2 shown in FIG. 19. After that, the base station 200 transmits transmission power control bits determined based on the reception quality (the reception SINR) of the signals from the mobile station 100.

In the mobile station 100, the I/N transmission power controller 123*b* determines the I/N transmission power control bits from the transmission power control bits extracted by the transmission power control bit extractor 119 in accordance with the above described technique. Based on the I/N transmission power control bits, the I/N transmission power controller 123*b* continues the same transmission power control as described above. At a predetermined timing (i.e., time t3 in FIG. 19), the control switch 128 switches the connections of the radio transmitter 122 to the transmission power controller 123*a*, in accordance with a switch control signal supplied from the predetermined controller.

The transmission power controller 123*a* then updates the transmission power of the radio transmitter 122 in each slot, based on the transmission power control bits that are transmitted from the base station 200 and extracted by the transmission power control bit extractor 119.

After synchronization is established at the base station 200 (i.e., after time t2), the reception quality (the reception SINR) of the signals transmitted from the mobile station 100 to the base station 200 becomes more stable. Accordingly, the variation of the transmission power after the transmission power control based on the transmission power control bits determined by the difference between the reception signal quality and the target quality becomes relatively small. In such a situation, the difference is only small between the variation of the transmission power updated in each slot based on the transmission power control bits transmitted from the base station 100 and the variation of the transmission power updated in each 3 slots based on the I/N transmission power control bits (see the variations after time t2, indicated by the solid line and the broken line in FIG. 19). Accordingly, the timing to switch the transmission power control operations from the transmission power control based on the I/N transmission power control bits to the transmission power control based on the original transmission power control bits (i.e., time t3) can be set at a relatively flexible and later point of time.

In the above example, each N bits of the transmission power control bits are scanned, and the representative value that represents the majority among each N bits is set as an I/N transmission power control bit. However, each of the I/N transmission power control bits may be the average value of each corresponding N bits.

In the above embodiments, the transmission power control in accordance with the gradually increasing bit pattern corresponds to the autonomous control step (the autonomous controller) in claims, the closed-loop control start timing determiner 135 corresponds to the autonomous control stop condition determining step (the autonomous control stop condition determiner) in claims, and the switch 126 corresponds to the control switching step (the control switcher) in claims.

Also, the I/N transmission power controller 123*b* shown in FIG. 18 corresponds to the gentle transmission power control step (the gentle transmission power controller) in claims. The predetermined controller that outputs the switch control signal shown in FIG. 18 corresponds to the gentle transmission power control stop determining step (the gentle transmission power control stop determiner) in claims. The control switch 128 shown in FIG. 18 corresponds to the control switching step (the control switcher) in claims.

The invention claimed is:

1. In radio transmitting and receiving of signals between a first communication device and a second communication device, a transmission power control method of controlling transmission power of the first communication device based on predetermined information supplied from the second communication device, the first communication device transmitting transmission power control information that is to be used in a transmission power control operation in the second communication device and is so determined that a reception signal quality of a signal transmitted from the second communication device and received by the first communication device approaches a target quality, the method comprising the steps of:

determining whether the reception signal quality is smaller than a first threshold value, or the reception signal quality has become lower than a target quality by more than a second threshold value; and autonomously controlling the transmission power of the first communication device by increasing the transmission power in accordance with predetermined characteristics, regardless of the predetermined information supplied from the second communication device, when the reception signal quality is determined to be smaller than the first threshold, or have become lower than the target quality by more than the second threshold value in the quality determining step, the transmission power of the first communication device being increased from the transmission power value that is observed at the time of the determination.

2. The transmission power control method of claim 1, wherein the predetermined characteristics increase the transmission power at a slower rate than the increased rate of transmission power that is controlled based on transmission power control bits that indicate a continuous power increase.

3. In radio transmitting and receiving of signals between a first communication device and a second communication device, a transmission power control device that controls transmission power of the first communication device based on predetermined information supplied from the second communication device, the first communication device transmitting transmission power control information that is to be used in a transmission power control operation in the second communication device and is so determined that a reception signal quality of a signal transmitted from the second communication device and received by the first communication device approaches a target quality, the transmission power control device comprising:

a quality determiner that determines whether the reception signal quality is smaller than a first threshold value, or the reception signal quality has become lower than a target quality by more than a second threshold value; and an autonomous controller that increases the transmission power of the first communication device in accordance with predetermined characteristics, regardless of the predetermined information supplied from the second communication device, when the quality determiner determines that the reception signal quality is smaller than the first threshold value or has become lower than the target quality by more than the second threshold value, the transmission power of the first communication device being increased from the transmission power value that is observed at the time of the determination.

4. A transmission power control method of controlling transmission power of a mobile station in a mobile communication system in which transmission power control information to be used in a transmission power control operation at the mobile station is transmitted from a base station to the mobile station and signal transmission and reception are performed between the base station and the mobile station to establish synchronization, before information data transmission is started between the base station and the mobile station, the method comprising the step of autonomously controlling transmission power of the mobile station to increase from an initial value in accordance with predetermined characteristics, regardless of the transmission power control information transmitted from the base station, after establishing synchronization at the mobile station with respect to a signal from the base station, wherein the predetermined characteristics are a bit pattern in which the transmission power is increased at a slower rate than an increased rate of transmission power controlled based on transmission power control bits that indicate a continuous power increase.

5. A transmission power control device that controls transmission power of a mobile station in a mobile communication system in which transmission power control information to be used in a transmission power control operation at the mobile station is transmitted from a base station to the mobile station and signal transmission and reception are performed between the base station and the mobile station to establish synchronization, before information data transmission is started between the base station and the mobile station, the transmission power control device comprising an autonomous controller that controls transmission power of the mobile station to increase from an initial value in accordance with predetermined characteristics, regardless of the transmission power control information transmitted from the base station, after synchronization with a signal from the base station is established at the mobile station, wherein the predetermined characteristics are a bit pattern in which the transmission power is increased at a slower rate than an increased rate of transmission power controlled based on transmission power control bits that indicate a continuous power increase.

6. A mobile station comprising a transmission power control device that controls transmission power when signals are transmitted to and from a base station so as to establish synchronization before information data is sent to the base station that transmits transmission power control information to be used in a transmission power control operation, the transmission power control device including an autonomous controller that controls transmission power to increase from an initial value in accordance with predetermined characteristics, regardless of the transmission power control information transmitted from the base station, after synchronization with a signal from the base station is established at the mobile station, wherein the autonomous controller controls transmission power to increase in accordance with more gradual variation characteristics than the variation characteristics of transmission power controlled based on the transmission power control information transmitted from the base station.

* * * * *